US007465757B2

(12) United States Patent
O'Connor et al.

(10) Patent No.: US 7,465,757 B2
(45) Date of Patent: Dec. 16, 2008

(54) FOAMED ISOCYANATE-BASED POLYMER, A MIX AND PROCESS FOR PRODUCTION THEREOF

(75) Inventors: James O'Connor, Cheshire, CT (US); Charles Nichols, Terre Haute, IN (US); Kenneth Knoblock, Terre Haute, IN (US)

(73) Assignee: Danisco A/S, Copenhagen (DK)

( * ) Notice: Subject to any disclaimer, the term of this patent is extended or adjusted under 35 U.S.C. 154(b) by 225 days.

(21) Appl. No.: 11/363,459

(22) Filed: Feb. 27, 2006

(65) Prior Publication Data
US 2006/0241199 A1 Oct. 26, 2006

Related U.S. Application Data

(63) Continuation-in-part of application No. 11/251,190, filed on Oct. 14, 2005.

(60) Provisional application No. 60/618,958, filed on Oct. 15, 2004.

(51) Int. Cl.
C08G 18/00 (2006.01)
(52) U.S. Cl. ..................... 521/170; 521/155; 521/174
(58) Field of Classification Search .................. 521/50, 521/172
See application file for complete search history.

(56) References Cited

U.S. PATENT DOCUMENTS

| | | |
|---|---|---|
| 2,436,967 A | 3/1948 | Leuck |
| 2,461,139 A | 2/1949 | Caldwell |
| 2,719,179 A | 9/1955 | Mora et al. |
| 3,318,868 A | 5/1967 | Evans et al. |
| 3,766,165 A | 10/1973 | Rennhard |
| 3,932,532 A | 1/1976 | Hunter et al. |
| 3,956,202 A | 5/1976 | Iwasaki |
| 3,973,049 A | 8/1976 | Furda et al. |
| 4,011,389 A | 3/1977 | Langdon |
| 4,035,235 A | 7/1977 | Richards et al. |
| 4,086,279 A | 4/1978 | Langdon et al. |
| 4,197,372 A | 4/1980 | Hostettler |
| 4,223,129 A | 9/1980 | Roth et al. |
| 4,237,182 A | 12/1980 | Fulmer et al. |
| 4,296,213 A | 10/1981 | Cuscurida et al. |
| 4,374,209 A | 2/1983 | Rowlands |
| 4,400,475 A | 8/1983 | Kennedy |
| 4,404,294 A | 9/1983 | Wiedermann |
| 4,404,295 A | 9/1983 | Bernstein et al. |
| 4,417,998 A | 11/1983 | Kennedy |
| 4,458,034 A | 7/1984 | Fracalossi et al. |
| RE31,757 E | 12/1984 | Kennedy |
| 4,517,360 A | 5/1985 | Volpenheim |
| 4,518,772 A | 5/1985 | Volpenheim |
| 4,518,778 A | 5/1985 | Cuscurida |
| 4,520,139 A | 5/1985 | Kennedy |
| 4,622,233 A | 11/1986 | Torres |
| 4,654,375 A | 3/1987 | Malwitz |
| 4,720,544 A | 1/1988 | Schouten |
| 4,948,596 A | 8/1990 | Bunick et al. |
| 4,950,743 A | 8/1990 | McCurry, Jr. et al. |
| 4,956,458 A | 9/1990 | Luo et al. |
| 4,965,354 A | 10/1990 | Yanaki et al. |
| 5,051,500 A | 9/1991 | Elmore |
| 5,091,015 A | 2/1992 | Bunick et al. |
| 5,292,778 A | 3/1994 | Van Veen et al. |
| 5,360,845 A | 11/1994 | Billmers et al. |
| 5,378,491 A | 1/1995 | Stanley et al. |
| 5,418,301 A | 5/1995 | Hult et al. |
| 5,424,418 A | 6/1995 | Duflot |
| 5,573,794 A | 11/1996 | Duflot |
| 5,585,506 A | 12/1996 | Harvey et al. |
| 5,589,577 A | 12/1996 | Peltonen et al. |
| 5,601,863 A | 2/1997 | Borden et al. |
| 5,620,871 A | 4/1997 | Caboche |
| 5,645,647 A | 7/1997 | Guzek et al. |
| 5,667,593 A | 9/1997 | Guzek et al. |
| 5,672,699 A | 9/1997 | Billmers et al. |
| 5,681,948 A | 10/1997 | Miller et al. |
| 5,767,257 A | 6/1998 | Schafermeyer et al. |
| 5,773,604 A | 6/1998 | Lefevre et al. |

(Continued)

FOREIGN PATENT DOCUMENTS

EP 0 289 461 11/1988

(Continued)

OTHER PUBLICATIONS

Donnelly, M.J. et al., *Carbohydrate Polymers*, 14 (1991) 221-240 "The Conversion of Polysaccharides into Polyurethanes: A Review".

(Continued)

*Primary Examiner*—Marc Zimmer
*Assistant Examiner*—Melissa Winkler
(74) *Attorney, Agent, or Firm*—Scully, Scott, Murphy & Presser, P.C.

(57) ABSTRACT

The invention relates to a foamed isocyanate-based polymer derived from a reaction mixture comprising an isocyanate, an active hydrogen-containing compound, a blowing agent and a highly branched polysaccharide which is derivatized to provide a hydrophobicity which renders it compatible with a polyether polyol with which the underivatized polysaccharide is incompatible. Further the invention relates to a mix and a process for the production of isocyanate-based polymer. The mix for the production of a foamed isocyanate-based polymer comprises a mixture of the derivatized polysaccharide of the invention and an active hydrogen-containing compound. The process for producing a foamed isocyanate-based polymer comprises the steps of: contacting an isocyanate, an active hydrogen-containing compound, a derivatized highly branched polysaccharide and a blowing agent to form a reaction mixture and expanding the reaction mixture to produce the foamed isocyanate-based polymer. The derivatized highly branched polysaccharide of the invention has an active hydrogen functionality of at least 15 and comprises randomly bonded glucopyranose units, having an average number of 10-100 glucose residues.

139 Claims, No Drawings

U.S. PATENT DOCUMENTS

| | | | |
|---|---|---|---|
| 5,840,883 | A | 11/1998 | Suzuki et al. |
| 5,886,161 | A | 3/1999 | Oka et al. |
| 5,945,519 | A | 8/1999 | Desai et al. |
| 5,977,348 | A | 11/1999 | Harris et al. |
| 6,011,092 | A | 1/2000 | Seppälä et al. |
| 6,037,466 | A | 3/2000 | Maliczyszyn et al. |
| 6,080,853 | A | 6/2000 | Corrigan et al. |
| 6,100,391 | A | 8/2000 | Gibson et al. |
| 6,121,440 | A | 9/2000 | Kenneally et al. |
| 6,204,369 | B1 | 3/2001 | Roth et al. |
| 6,303,777 | B1 | 10/2001 | Kao et al. |
| 6,423,756 | B1 * | 7/2002 | Ghobary et al. ............. 521/128 |
| 6,455,512 | B1 | 9/2002 | Ward |
| 6,475,552 | B1 | 11/2002 | Shah et al. |
| 6,495,679 | B1 | 12/2002 | Tanaka |
| 6,605,715 | B1 | 8/2003 | Lammers et al. |
| 6,620,952 | B1 | 9/2003 | Corrigan |
| 6,649,667 | B2 * | 11/2003 | Clatty ....................... 521/170 |
| 6,706,877 | B1 | 3/2004 | Claverie et al. |
| 2002/0132870 | A1 * | 9/2002 | Younes ...................... 521/155 |
| 2003/0236315 | A1 | 12/2003 | Xie et al. |
| 2003/0236316 | A1 | 12/2003 | Heumen et al. |

FOREIGN PATENT DOCUMENTS

| | | |
|---|---|---|
| EP | 0 416 670 | 3/1991 |
| GB | 1453258 | 10/1976 |
| WO | WO 86/02076 | 4/1986 |
| WO | WO 92/12179 | 7/1992 |
| WO | WO 94/22919 | 10/1994 |
| WO | WO 02/10189 | 2/2002 |
| WO | WO 02/069981 | 9/2002 |
| WO | WO 02/083739 | 10/2002 |

OTHER PUBLICATIONS

Herrington, R. et al., "Flexible Polyurethane Foams", 1997, Chapter 2.

* cited by examiner

FOAMED ISOCYANATE-BASED POLYMER, A MIX AND PROCESS FOR PRODUCTION THEREOF

This is a continuation-in-part of U.S. patent application Ser. No. 11/251,190, filed Oct. 14, 2005, which claims priority, under 35 U.S.C. §119(c), of U.S. provisional patent application, Ser. No. 60/618,958, Oct. 15, 2004.

The invention relates to a foamed isocyanate-based polymer derived from a reaction mixture comprising an isocyanate, an active hydrogen-containing compound, a blowing agent and a highly branched polysaccharide which is derivatized to provide a hydrophobicity which renders it compatible with a polyether polyol with which the underivatized polysaccharide is incompatible. Further the invention relates to a mix and a process for the production of isocyanate-based polymer.

The mix for the production of a foamed isocyanate-based polymer comprises a mixture of the derivatized polysaccharide and an active hydrogen-containing compound. The process for producing a foamed isocyanate-based polymer comprises the steps of: contacting an isocyanate, an active hydrogen-containing compound, a highly branched polysaccharide and a blowing agent to form a reaction mixture and expanding the reaction mixture to produce the foamed isocyanate-based polymer. The polysaccharide of the mix and the process is derivatized to provide a hydrophobicity which renders it compatible with a polyether polyol with which the underivatized polysaccharide is incompatible. The derivatized highly branched polysaccharide of the invention has an active hydrogen functionality of at least 15 and comprises randomly bonded glucopyranose units, having an average number of 10-100 glucose residues.

BACKGROUND OF THE INVENTION

Isocyanate-based polymers are known in the art. Generally, those of skill in the art understand isocyanate-based polymers to be polyurethanes, polyureas, polyisocyanurates and mixtures thereof.

It is also known in the art to produce foamed isocyanate-based polymers. Indeed, one of the advantages of isocyanate-based polymers compared to other polymer systems is that polymerization and foaming can occur in situ. This results in the ability to mould the polymer while it is forming and expanding.

One of the conventional ways to produce a polyurethane foam is known as the "one-shot" technique. In this technique, the isocyanate, a suitable polyol, a catalyst, water (which acts as a reactive "blowing" agent and can optionally be supplemented with one or more physical blowing agents) and other additives are mixed together using, for example, impingement mixing (e.g., high pressure). Generally, if a polyurea is produced, the polyol is replaced with a suitable polyamine. A polyisocyanurate may result from cyclotrimerization of the isocyanate component. Urethane modified polyureas or polyisocyanurates are known in the art. In either scenario, the reactants would be intimately mixed very quickly using a suitable mixing technique.

Another technique for producing foamed isocyanate-based polymers is known as the "prepolymer" technique. In this technique, a prepolymer is produced by reacting polyol and isocyanate (in the case of a polyurethane) in an inert atmosphere to form a liquid polymer terminated with reactive groups (e.g., isocyanate moieties and active hydrogen moieties). Typically the prepolymer is produced with an excess of isocyanate groups so all the active hydrogen groups are reacted. To produce the foamed polymer, the prepolymer is thoroughly mixed with a lower molecular weight polyol (in the case of producing a polyurethane) or a polyamine (in the case of producing a modified polyurea) in the presence of a curing agent and other additives, as needed.

Regardless of the technique used, it is known in the art to include a filler material in the reaction mixture. Conventionally, filler materials have been introduced into foamed polymers by loading the filler material into one or both of the liquid isocyanate and the liquid active hydrogen-containing compound (i.e., the polyol in the case of polyurethane, the polyamine in the case of polyurea, etc.). Generally, incorporation of the filler material serves the purpose of conferring so-called load building properties to the resulting foam product.

The nature and relative amounts of filler materials used in the reaction mixture can vary, to a certain extent, depending on the desired physical properties of the foamed polymer product, and limitations imposed by mixing techniques, the stability of the system and equipment imposed limitations (e.g., due to the particle size of the filler material being incompatible with narrow passages, orifices and the like of the equipment).

One known technique of incorporating a solid material in the foam product for the purpose of improving hardness properties involves the use of a polyol-solids dispersion, particularly one in the form of a polymer polyol, i.e. a graft copolymer polyol. As is known in the art, graft copolymer polyols (copolymer polyols) are polyols, preferably polyether polyols, which contain other organic polymers. It is known that such graft copolymer polyols are useful to confer hardness (i.e., load building) to the resultant polyurethane foam compared to the use of polyols which have not been modified by incorporating the organic polymers. Within graft copolymer polyols, there are two main categories which may be discussed: (i) chain-growth copolymer polyols, and (ii) step-growth copolymer polyols.

Chain-growth copolymer polyols generally are prepared by free radical polymerization of monomers in a polyol carrier to produce a free radical polymer dispersed in the polyol carrier. Conventionally, the free radical polymer can be based on acrylonitrile or styrene-acrylonitrile (SAN). The solids content of the polyol is typically up to about 60%, usually in the range of from about 15% to about 40%, by weight of the total weight of the composition (i.e., free radical polymer and polyol carrier). Generally, these chain-growth copolymer polyols have a viscosity in the range of from about 1,000 to about 8,000 centipoise. When producing such chain-growth copolymer polyols, it is known to induce grafting of the polyol chains to the free-radical polymer.

Step-growth copolymer polyols generally are characterized as follows: (i) PHD (Polyharnstoff Disperion) polyols, (ii) PIPA (Poly Isocyanate Poly Addition) polyols, and (iii) epoxy dispersion polyols. PHD polyols are dispersions of polyurea particles in conventional polyols and generally are formed by the reaction of a diamine (e.g., hydrazine) with a diisocyanate (e.g., toluene diisocyanate) in the presence of a polyether polyol. The solids content of the PHD polyols is typically up to about 50%, usually in the range of from about 15% to about 40%, by weight of the total weight of the composition (i.e., polyurea particles and polyol carrier). Generally, PHD polyols have a viscosity in the range of from about 2,000 to about 6,000 centipoises. PIPA polyols are similar to PHD polyols but contain polyurethane particles instead of polyurea particles. The polyurethane particles in PIPA polyols are formed in situ by reaction of an isocyanate and alkanolamine (e.g., triethanolamine). The solids content of the PIPA polyols is typically up to about 80%, usually in the range of from about 15% to about 70%, by weight of the total weight of the composition (i.e., polyurethane particles and polyol carrier). Generally, PIPA polyols have a viscosity in the range of from about 4,000 to about 50,000 centipoises. See, for example, U.S. Pat. Nos. 4,374,209 and 5,292,778. Epoxy dispersion polyols are based on dispersions of cured epoxy resins in conventional based polyols. The epoxy particles are purportedly high modulus solids with improved hydrogen bonding characteristics.

Further information regarding useful graft copolymer polyols may be found, for example, in Chapter 2 of "Flexible Polyurethane Foams" by Herrington and Hock (1997) and the references cited therein.

Untreated carbohydrates have been incorporated as direct additives into isocyanate-based polymer foams in two ways—1) as a partial or complete replacement for the polyol component, and 2) as an unreacted additive or filler. The carbohydrate can be introduced into the foam starting materials either as a solution or as a fine solid. When added as a solution, the hydroxyl groups on the carbohydrate can react with the isocyanate component and become chemically incorporated into the structure of the polyurethane. Examples of carbohydrates include certain starches, corn syrup, cellulose, pectin as described in U.S. Pat. No. 4,520,139, mono- and disaccharides as described in U.S. Pat. Nos. RE31,757, 4,400,475, 4,404,294, 4,417,998, oligosaccharides as described in U.S. Pat. No. 4,404,295 and pregelatinized starch as described in U.S. Pat. No. 4,197,372. As a solid dispersion, the carbohydrate may be inert in the polymerization reaction, but is physically incorporated into the foam. The advantage is lower cost and the ability of the carbohydrates to char upon combustion, preventing further burning and/or dripping of the foam and reducing smoke formation as described in U.S. Pat. Nos. 3,956,202, 4,237,182, 4,458,034, 4,520,139, 4,654,375. Starch and cellulose are commonly used for this purpose. The starch or cellulose may also be chemically modified prior to foam formulation as described in U.S. Pat. Nos. 3,956,202 and 4,458,034.

Further the use of dendritic macromolecules in isocyanate based foams is described in U.S. Pat. No. 5,418,301, WO 02/10189 and US applications US 2003/0236315 and US 2003/0236316.

Despite the advances made in the art, there exists a continued need for the development of novel load building techniques. Specifically, many of the prior art approaches discussed hereinabove involve the use of relatively expensive materials (e.g., the graft copolymer polyols described above) which can be complicated to utilize in a commercial size facility. Thus, it would be desirable to have a load building technique which could be conveniently applied to polyurethane foam as an alternative to conventional load building techniques. It would be further desirable if the load building technique was relatively inexpensive and/or improved other properties of the polyurethane foam and/or could be incorporated into an existing production scheme without great difficulty.

It should be noted that all documents cited in this text ("herein cited documents") as well as each document or reference cited in each of the herein-cited documents, and all manufacturer's literature, specifications, instructions, product data sheets, material data sheets, and the like, as to the products and processes mentioned in this text, are hereby expressly incorporated herein by reference.

SUMMARY OF THE INVENTION

The present invention relates to a foamed isocyanate-based polymer derived from a reaction mixture comprising an isocyanate, an active hydrogen-containing compound, a blowing agent and a highly branched polysaccharide. The highly branched polysaccharide is derivatized to provide a hydrophobicity which renders it compatible with a polyether polyol with which the underivatized polysaccharides are incompatible. The polysaccharide comprises randomly bonded glucopyranose units, having an average number of 10-100 glucose residues and the derivatized polysaccharide has an active hydrogen functionality of 15 or more.

The invention also relates to a mix for the production of the foamed isocyanate-based polymer. The mix comprises a polyether polyol and a highly branched polysaccharide of randomly bonded glucopyranose units, having an average number of 10-100 glucose residues, wherein said polysaccharide has an active hydrogen functionality of at least 15. The polysaccharide is derivatized to provide a hydrophobicity which renders it compatible with said polyether polyol with which the underivatized polysaccharide is incompatible.

A process for producing a foamed isocyanate-based polymer is also provided. The process comprises the steps of: contacting an isocyanate, an active hydrogen-containing compound, a blowing agent and a highly branched polysaccharide of randomly bonded glucopyranose units, having an average number of 10-100 glucose residues and an active hydrogen functionality of at least 15, to form a reaction mixture. The reaction mixture is expanded to produce the foamed isocyanate-based polymer. The polysaccharide is derivatized to provide a hydrophobicity which renders it compatible with a polyether polyol with which the underivatized polysaccharide is incompatible.

DETAILED DESCRIPTION OF THE INVENTION

The present inventors have surprisingly found that a subgroup of derivatized highly branched polysaccharides is particularly advantageous to confer load building properties in an isocyanate-based foam.

The derivatized highly branched polysaccharides are suitably modified to increase their hydrophobic character, and thereby their compatibility with polyether polyols. The subgroup of derivatized highly branched polysaccharides may partially or fully displace copolymer polyols conventionally used to confer load building characteristics in isocyanate-based polymer foams. The derivatized highly branched polysaccharides are described in detail in U.S. patent application U.S. 60/619,109 filed on the same day, in the name of the same inventors and with the title "A derivatized highly branched polysaccharide and a mix for production of polyurethane thereof", the contents of which are hereby incorporated by reference.

Accordingly, the present invention discloses the use of a group of derivatized highly branched polysaccharides incorporated in polyurethane foams. The derivatized highly branched polysaccharides confer significant load building properties to the foam matrix of the isocyanate-based polymer and may be used for this purpose to partially or fully displace current relatively expensive chemical systems which are used to confer load building characteristics to isocyanate-based polymer foams, such as advantageous load building characteristics in polyurethane formulations.

A feature of the present derivatized highly branched polysaccharide is that at least 5% by weight of the derivatized highly branched polysaccharide may be mixed with a polyether polyol having a hydroxyl value of 60 or less to form a stable, i.e. a uniform liquid at 23° C.

Unless otherwise specified, the terms used in the present specification and claims shall have the following meanings;

The term "highly branched" when used to describe the polysaccharide of the invention refers to a polysaccharide which has at least some doubly or triply branched units. A glucopyranose unit which has three linkages is a doubly branched unit and a unit which has four linkages is a triply branched unit. The area (%) of double and/or triple branches in a linkage analysis of the polysaccharide is preferably 0.5-10%, more preferably 1-7% and most preferably 2-5%. Specific examples of such highly branched polysaccharides comprise polydextrose and a polysaccharide produced from starch in a heat treatment process known as pyroconversion.

The term "functionality" of the derivatized highly branched polysaccharide and its derivative is dependent upon the average number of glucose residues and refers to the number active hydroxyl groups per molecule. For the purposes of "functionality," the polysaccharide molecule is defined as low-monomer polysaccharide. Normally in a strict sense functionality refers to the number of isocyanate-reactive hydrogens on molecules in the polyol side of the formulation.

The term "polydextrose" as used herein refers to one example of a highly branched polysaccharide. It includes polymer products of glucose which are prepared from glucose, maltose, oligomers of glucose or hydrolyzates of starch, which are polymerized by heat treatment in a polycondensation reaction in the presence of an acid e.g. Lewis acid, inorganic or organic acid, including monocarboxylic acid, dicarboxylic acid and polycarboxylic acid, such as, but not limited to the products prepared by the processes described in the following U.S. Pat. Nos. 2,436,967, 2,719,179, 4,965,354, 3,766,165, 5,051,500, 5,424,418, 5,378,491, 5,645,647 5,773,604, or 6,475,552, the contents of all of which are incorporated herein by reference.

The term polydextrose also includes those polymer products of glucose prepared by the polycondensation of glucose, maltose, oligomers of glucose or starch hydrolyzates described hereinabove in the presence of a sugar alcohol, e.g. polyol, such as in the reactions described in U.S. Pat. No. 3,766,165. Moreover, the term polydextrose includes the glucose polymers, which have been purified by techniques described in prior art, including any and all of the following but not limited to (a) neutralization of any acid associated therewith by base addition thereto, or by passing a concentrated aqueous solution of the polydextrose through an adsorbent resin, a weakly basic ion exchange resin, a type II strongly basic ion-exchange resin, mixed bed resin comprising a basic ion exchange resin, or a cation exchange resin, as described in U.S. Pat. Nos. 5,667,593 and 5,645,647, the contents of which are incorporated by reference; or (b) decolorizing by contacting the polydextrose with activated carbon or charcoal, by slurrying or by passing the solution through a bed of solid adsorbent or by bleaching with sodium chlorite, hydrogen peroxide and the like; (c) molecular sieving methods, like UF, RO (reverse osmosis), size exclusion, and the like; (d) or enzymatically treated polydextrose or (e) any other recognized techniques known in the art. Among the purification processes used in the art the following may be especially mentioned: bleaching, e.g. using hydrogen peroxide as described in U.S. Pat. No. 4,622,233; membrane technology as described in U.S. Pat. No. 4,956,458; ion exchange e.g. removal of citric acid as described in U.S. Pat. No. 5,645, 647 or removal of color/bitter taste as described in U.S. Pat. No. 5,091,015; chromatographic separation, with a strong cation exchanger as described in WO92/12179; hydrogenation, in combination with ion exchange as described in U.S. Pat. Nos. 5,601,863; 5,573,794 or with ion exchange and chromatographic separation as described in U.S. Pat. No. 5,424,418; or solvent extraction as described in U.S. Pat. No. 4,948,596; EP 289 461, the contents of said patents being incorporated by reference.

Moreover, the term polydextrose includes hydrogenated polydextrose, which, as used herein, includes hydrogenated or reduced polyglucose products prepared by techniques known to one of ordinary skill in the art. Some of the techniques are described in U.S. Pat. Nos. 5,601,863, 5,620,871 and 5,424,418, the contents of which are incorporated by reference. The term polydextrose also encompasses fractionated polydextrose which is a conventional, known material and can be produced e.g. by the processes disclosed in U.S. Pat. Nos. 5,424,418 and 4,948,596 the contents of which are incorporated by reference.

Polydextrose is commercially available from companies such as Danisco Sweeteners, Staley and Shin Dong Bang. Purified forms of polydextrose are marketed by Danisco Sweeteners under the name Litesse® or Litesse®II and by Staley under the name Stalite III. A reduced, i.e. a hydrogenated form of Litesse® is called Litesse® Ultra. The specifications of the Litesse® polydextrose products are available from Danisco Sweeteners.

A further highly branched polysaccharide is derived by pyroconversion from starch. Starch is made of glucose molecules attached by α-(1,4) bonds, with some branching by means of α-(1,6) bonds. The degree of branching depends on the source of the starch. The polysaccharide is produced from starch in a heat treatment process known as pyroconversion. Pyrodextrins are starch hydrolysis products obtained in a dry roasting process either using starch alone or with trace levels of acid catalyst. The first product formed in this reaction is soluble starch, which in turn hydrolyzes further to form dextrins. The molecular weight of the final product depends on the temperature and duration of heating. Transglucosidation can occur in the dextrinization process, in which rupture of an α-(1,4) glucosidic bond is immediately followed by combination of the resultant fragments with neighboring hydroxyl groups to produce new linkages and branched structures. Thus, a portion of the glycosidic bonds are scrambled. A commercially available pyroconverted starch is called Fibersol-2® and is available from Matsutani America, Inc.

As used throughout this specification, the term "compatible", when used in connection with the solubility characteristics of the derivatized highly branched polysaccharide, it is intended to mean that the liquid formed upon mixing the derivatized highly branched polysaccharide and the polyether polyol does not cause precipitation and thus is uniform and stable. Further the formed liquid has a substantially constant light transmittance (transparent at one extreme and opaque at the other extreme) for at least 2 hours, preferably at least 30 days, more preferably a number of months, after production of the mixture. In different embodiments, the stable liquid will be in the form of a clear, homogeneous liquid (e.g., a solution) which will remain as such over time or in the form of an emulsion of the derivatized highly branched polysaccharide in the polyol which will remain as such over time—i.e. the polysaccharide will not settle out over time. The polarity may moreover be reflected by a term known as the solubility parameter (δ), a value which for the very polar water is 23.4 and decreases as one moves to very non polar solvents as methyl t-butyl ether, for which the solubility parameter is 7.4. A polymer with a solubility parameter similar to the solvent will dissolve in it. Components with dramatic differences in solubility parameters, for example water and oil—will not dissolve.

The term "compatibility indicating mixture" refers to a mixture of the derivatized highly branched polysaccharide and a polyether polyol, which forms a uniform liquid at 23° C. The hydrophobicity of the derivatized highly branched polysaccharide is sufficient to provide a uniform liquid mixture although the underivatized polysaccharide is incompatible with the polyether polyol, i.e. does not form a uniform liquid mixture in the same conditions.

The term "load efficiency", as used throughout this specification, indicates the ability of the derivatized highly branched polysaccharide to generate firmness in an isocyanate based foam matrix. The efficiency is defined as the number of Newtons of foam hardness increase per % of the derivatized highly branched polysaccharide in the resin blend. Typically, foam firmness is described using Indentation Force Deflection (IFD) at 50% deflection or Compressive Load Deflection (CLD) at 25%, 50% and/or 65% deflection, measured pursuant to ASTM D3574. An IFD number represents the pounds of force required to indent a foam sample by a specified percentage of its original thickness. The CLD values are given in pounds per square inch (psi). The force in pounds needed to compress the sample is recorded and the result is reported in psi by dividing the force by the surface area of the sample. One indication of the resilience of flexible foams is the ratio of indentation deflection or compression measured at two compression depths. Typically this is obtained at 25% and 65% of foam thickness and is expressed as the ratio of the value at 65% divided by the value at 25% (65:25 ratio). A 65:25 ratio greater than 2.4 indicates that the foams can be classified as high resilience foams. The 65:25 ratio may also be referred to as the sag factor or compression modulus.

The term "index" refers to the ratio of isocyanate groups of the isocyanate and hydroxyl groups of the polyol composition [NCO/OH].

The term "isocyanate-based polymer" is intended to mean, inter alia, polyurethane, polyurea and polyisocyanurate.

The foamed isocyanate-based polymer of the invention comprises a derivatized highly branched polysaccharide of randomly bonded glucopyranose units having an average number of 10-100 glucose residues. Moreover the polysaccharide used has an active hydrogen functionality of at least 15, preferably 15 to 70, more preferably 20 to 60, most preferably 30 to 50. The polysaccharide is derivatized to provide a hydrophobicity which renders it compatible with a polyether polyol with which the underivatized polysaccharide is incompatible. The glycosidic bonds of the polysaccharide may be alpha or beta and may consist of any of the possible combinations, 1,2 to 1,6; 2,1 to 2, 6; etc.

Furthermore the invention relates to a mix for the production of an isocyanate based polymer comprising a mixture of a polyether polyol and a highly branched polysaccharide of randomly bonded glucopyranose units, having an average number of 10-100 glucose residues. The polysaccharide has an active hydrogen functionality of at least 15 and is derivatized to provide a hydrophobicity which renders it compatible with said polyether polyol with which the underivatized polysaccharide is incompatible. The mix may further comprise a blowing agent, at least one catalyst and at least one surfactant.

In a preferred embodiment the mix comprises 1 to 50%, more preferably 5 to 20%, most preferably 10 to 15% by weight of the derivatized polysaccharide.

A suitable mix may comprise one or more polyether polyols, copolymer polyols, blowing agent(s), catalyst(s), surfactant(s) and additives, for example pigments or fillers or ingredients necessary to achieve a desired property such as flame retardancy, increased durability etc. For instance, the following constituents noted in parts per hundred polyol may be added to the mix: water (1-30), catalyst (1-10), surfactant (1-25), crosslinking agent (0-30) and if desired, an auxiliary blowing agent (0-100). Moreover a process for producing a foamed isocyanate-based polymer is provided. The process comprises the steps of: contacting an isocyanate, an active hydrogen-containing compound, a blowing agent and a highly branched polysaccharide to form a reaction mixture; and expanding the reaction mixture to produce the foamed isocyanate-based polymer. The highly branched polysaccharide has randomly bonded glucopyranose units, an average number of 10-100 glucose residues and an active hydrogen functionality of at least 15. Further the polysaccharide is derivatized to provide a hydrophobicity which renders it compatible with a polyether polyol with which the underivatized polysaccharide is incompatible.

In a preferred embodiment the derivatized highly branched polysaccharide of the present invention is used as a partial or total replacement for copolymer polyols in high resilient (HR) molded flexible polyurethane foam applications. High resilient foams are for example used as cushion material and even structural elements in household furnishings and automobiles. The derivatized highly branched polysaccharide or mix of the invention may also be used as a partial or total replacement for copolymer polyols in carpet underlay and packaging foam applications. Foams can be made in slabs and then crushed and/or cut, or they can be molded.

Preferably, the isocyanate-based polymer is selected from the group comprising polyurethane, polyurea, polyisocyanurate, urea-modified polyurethane, urethane-modified polyurea, urethane-modified polyisocyanurate and urea-modified polyisocyanurate. As is known in the art, the term "modified", when used in conjunction with a polyurethane, polyurea or polyisocyanurate means that up to 50% of the polymer backbone forming linkages have been substituted. The isocyanate-based polymer may be formed by the reaction between the mix containing isocyanate-reactive hydrogens, and an isocyanate chosen from the class of readily available isocyanato aromatic compounds.

There are a number of ways to increase the hydrophobic character of the highly branched polysaccharides of the invention. For example, an octenylsuccinylation may be carried out as described in U.S. Pat. Nos. 4,035,235; 5,672,699; or 6,037,466. However, a preferred approach is esterification with a fatty acid, preferably containing 6 to 12 carbon atoms. Methods for esterifying similar structures such as starch are described in U.S. Pat. Nos. 2,461,139; 4,720,544; 5,360,845; 6,455,512; and 6,495,679. Methods for esterifying other polysaccharides are disclosed in U.S. Pat. Nos. 4,517,360; 4,518,772; 5,589,577; 5,840,883; 5,977,348; and 6,706,877.

There are several different synthetic routes described in prior art. Modifying starch with solvents are described in U.S. Pat. Nos. 5,589,577, 5,681,948, 5,840,883 and 6,495,679. Methods for producing alkyl ester derivatives of sucrose, which reactions require no solvent and are carried out under vacuum in the melt are described in U.S. Pat. Nos. 4,517,360, 4,518,772, 5,585,506, 5,681,948, 5,767,257, 5,945,519, 6,080,853, 6,121,440, 6,303,777, 6,620,952 and 6,706,877. Another derivatization procedure described in U.S. Pat. Nos. 4,011,389, 4,223,129, 4,720,544, 4,950,743, 5,886,161, 6,100,391 and 6,204,369 covers the reaction of a long chain alcohol directly with the polysaccharide producing glucoside structure. A process where the same number of hydroxyl groups remains in the final product and where a long chain α olefin epoxide monomer in the presence of base is added to polyols to introduce the desired hydrophobicity is described in U.S. Pat. Nos. 3,932,532 and 4,011,389. Processes where water is present are described in U.S. Pat. Nos. 2,461,139, 3,318,868, 4,720,544, 5,360,845, 6,011,092, 6,455,512 and 6,605,715. A process for modifying carbohydrates which utilizes epichlorohydrin which is reacted with a long chain alcohol in the presence of a Lewis acid catalyst and after neutralization, and were the product is added to a polyglycerol which has been converted to its alkoxide is described in U.S. Pat. No. 4,086,279. Moreover a process for esterification of starch where high boiling solvents such as DMF or DMSO are replaced by supercritical $CO_2$ is described in U.S. Pat. No. 5,977,348.

A particularly straight forward method of derivatizeing the polysaccharide is comprised of the steps of: mixing a highly branched polysaccharide with a suitable ether or aromatic hydrocarbon solvent, such as tetrahydrofuran, diethylene glycol dimethyl ether, xylene or toluene; adding a base, such as NaOH or KOH; and, then a carboxylic acid. The reaction is driven to completion with heat and at the same time removing water.

Alternatively, the hydrophobicity imparting carboxylic acid moiety can be added during or near the completion of the polysaccharide preparation reaction.

As described above the preferred polysaccharide composition utilized in the process for preparing an isocyanate-based polymer comprises a derivatized highly branched polysaccharide of randomly bonded glucopyranose units having an average number of 10-100 glucose residues.

The hydrophobicity of the derivatized highly branched polysaccharide used in the invention should provide a compability which is sufficient to cause a mixture of said polysaccharide and said polyether polyol to form a uniform liquid at 23° C. when the compatibility indicating mixture comprises at least 5% (w/w) of said polysaccharide. The underivatized polysaccharide is incompatible in this polyether polyol. Preferably the compatibility indicating mixture comprises 5 to 50%, more preferably 5 to 40%, most preferably 5 to 30% of the derivatized polysaccharide and still forms a uniform liquid at 23° C.

In one embodiment of the invention the polysaccharide is derivatized by a chemical reaction with a hydrophobic organic compound comprising 6-20 carbon atoms selected from aliphatic and aromatic carbon atoms and combinations thereof. More in detail; the organic compound is selected from $C_6$-$C_{12}$ carboxylic acids and $C_6$-$C_{12}$ organic alcohols. In a preferred embodiment the carboxylic acid is selected from fatty acids or reactive derivatives thereof. The organic alcohols can be selected from diols and monols, preferably containing at least one primary hydroxyl group.

In a preferred embodiment ester groups are introduced to the polysaccharide whereupon the solubility parameter of the polysaccharide derivatives lowers. When the solubility parameter is below 14, preferably below 12 the modified polysaccharide dissolves in solvents in which underivatized and less substituted polysaccharide is insoluble. The hydrophilicity decreases and therefore the solubility of the polysaccharide derivatives in less polar solvents increases as the degree of substitution increases.

In a preferred embodiment where the polysaccharide is derivatized with a fatty acid, the weight of fatty acid residues in the derivatized polysaccharide is 5 to 50%, more preferably 15 to 40% based on the weight of the derivatized highly branched polysaccharide.

The polyether polyol, with which the underivatized polysaccharide is incompatible may primarily comprise polypropylene oxide, preferably at least 50% polypropylene oxide, more preferably at least 70%, still more preferably 70 to 90%, most preferably 75 to 80%. It may preferably have a hydroxyl value of at most 60 mg KOH/g, more preferably 15 to 55 mg KOH/g, most preferably 28 to 36 mg KOH/g.

Further the polyether polyol may have a molecular weight in the range of from 200 to 12,000, preferably from 2,000 to 7,000, most preferably from 2,000 to 6,000.

In one embodiment of the present invention the polysaccharide consists of randomly cross-linked glucose units with all types of glycosidic bonds, containing minor amounts of a bound sugar alcohol and an acid, and having an average molecular weight between about 1,500 and 18,000. The polysaccharide has predominantly 1,6 glycosidic bonds and is a polycondensation product of glucose, maltose or other simple sugars or glucose-containing material such as hydrolyzed starch and a sugar alcohol in the presence of an acid, preferably a carboxylic acid.

Examples of suitable acids include, but are not limited to mono, di or tri carboxylic acids or their potential anhydrides, such as formic, acetic, benzoic, malonic, fumaric, succinic, adipic, itaconic, citric and the like, and/or a mineral acids, such hydrochloric acid, sulfuric acid, sulfurous acid, thiosulfuric acid, dithionic acid, pyrosulfuric acid, selenic acid, selenious acid, phosphorous acid, hypophosphorous acid, pyrophosphoric acid, polyphosphoric acid, hypophosphoric acid, boric acid, perchloric acid, hypochlorous acid, hydrobromic acid, hydriodic acid and silicic acid; acidic alkali metal or alkaline earth metal salts of the above acids such as sodium bisulfate and sodium bisulfite; or mixtures of these acids (and/or acidic alkali or alkaline earth metals salts) with phosphoric acid and the like at about 0.001-3%. The polysaccharide thus produced will contain minor amounts of unreacted sugar alcohol and/or acid and a mixture of anhydroglucoses (reaction intermediates).

In a preferred embodiment the sugar alcohols are selected from the group consisting of sorbitol, glycerol, erythritol, xylitol, mannitol, galactitol or mixtures thereof, typically at a level of 5-20% by weight, preferably 5-15%, more preferably 8-12%.

The polysaccharide formed may be further purified or modified by a variety of chemical and physical methods used alone or in combination. These include, but are not limited to: chemical fractionation, extraction with organic solvents, neutralization with a suitable base, purification by chromatography (such as ion exchange or size exclusion), membrane or molecular filtration, further enzyme treatment, carbon treatment and hydrogenation, which is a specific process of reduction.

In the most preferred embodiment of the invention the polysaccharide is a polycondensation product of glucose, sorbitol and citric acid. The water soluble polysaccharide is produced by reacting glucose with sorbitol (8-12% by weight) in the presence of citric acid (0.01-1% by weight) under anhydrous melt conditions and reduced pressure. The polysaccharide may be purified by ion exchange to produce a form in which the acidity is less than 0.004 meq/gm; referred to as low-acidity polyol. Or, it may be purified by a combination of ion exchange and hydrogenation; referred to as hydrogenated polyol. Upon hydrogenation the reducing saccharides are typically less than 0.3% of the total carbohydrate content. Or, it may be further purified by anion exchange and molecular filtration to reduce acidity and the concentration of monomeric reaction by-products; referred to as low-monomer polyol. A portion of the water used in processing may be removed to achieve the desired moisture content. In the low-acidity and hydrogenated forms the polysaccharide constitutes about 90% of the total carbohydrate content: the remainder consisting of glucose, sorbitol and anhydroglucoses. In the low-monomer form the polysaccharide constitutes 99+% of the total carbohydrate content. In this most preferred embodiment the highly branched polysaccharide is a polydextrose. The water content in all the above mentioned cases may also be adjusted to allow milling as either a coarse or fine powder.

In another embodiment of the invention the polysaccharide has predominantly beta-1,4 linkages and a varying number of glucose residues which are hydrolyzed from starch to form dextrins and subsequently linked to form branched structures. In this embodiment the polysaccharide is preferably pyroconverted starch.

The active hydrogen-containing compound of the invention is selected from the group comprising polyols, polyamines, polyamides, polyimines and polyolamines. In a preferred embodiment the active hydrogen-containing compound comprises a polyol. The polyol comprises a hydroxyl-terminated backbone of a member selected from the group comprising polyether, polyesters, polycarbonate, polydiene and polycaprolactone. The polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols, polyalkyleneether triols and mixtures thereof. The polyol is selected from the group comprising adipic acid-ethylene glycol polyester, poly(butylene glycol), poly(propylene glycol) and hydroxyl-terminated polybutadiene.

In a more preferred embodiment the polyol comprises a polyether polyol, which may contain polypropylene oxide. Further the polyether polyol preferably has a functionality of at least 2. The molecular weight of the polyether polyol is in the range of from about 200 to about 12,000, preferably 2,000 to about 7,000, more preferably 2,000 to 6,000. Further the polyether polyol of the reaction mixture may be the same or different from the polyether polyol of the compability indicating mixture.

In a preferred embodiment the foamed isocyanate-based polymer of the invention is flexible polyurethane foam.

The active hydrogen-containing compound may also be selected from the group comprising a polyamine and a polyalkanolamine, preferably the polyamine is selected from the group comprising primary and secondary amine terminated polyethers. In a preferred embodiment these polyethers have a molecular weight of at least about 230 and a functionality of from about 2 to about 6. In another preferred embodiment the polyether has a molecular weight of at least about 230 and a functionality of from about 1 to about 3.

In another preferred embodiment the mix of the invention may in addition to the polyether polyol and the polysaccharide comprise at least one catalyst and at least one surfactant or these may be used in the process for producing isocyanate-based polymer. Any suitable catalyst and surfactant known in the art may be used to obtain the desired characteristics. The catalyst used in the reaction mixture is a compound capable of catalyzing the polymerization reaction. In a preferred embodiment of the invention the catalyst may be selected from the group consisting of tertiary amines and metallic salts or mixtures thereof. Amine catalysts can include, but are not limited to methyl morpholine, triethylamine, trimethylamine, triethylenediamine and pentamethyldiethylenetriamine. Metallic salts can include, but are not limited to tin or potassium salts such as potassium octoate and potassium acetate. A mixture of catalysts is preferred (e.g. Polycat®5, 8,46K; Dabco® K15, 33LV, TMR—all produced by Air Products; Jeffcat® ZF10—produced by Huntsman). Further, U.S. Pat. Nos. 4,296,213 and 4,518,778 discusses suitable catalyst compounds. In a preferred embodiment of the invention the surfactants may be silicone surfactants used to aid dimensional stability and uniform cell formation. Examples of suitable silicone surfactants are the Dabco® series DC5890, DC 5598, DC5043, DC5357 and DC193—all produced by Air Products.

The mix or the process of the invention may further comprise at least one blowing agent selected from water, non-water blowing agents, liquid carbon dioxide and combinations thereof. Preferably the blowing agent comprises water. The non-water blowing agents are preferably low-boiling organic liquids, such as acetone, methyl, formate, formic acid, pentane(s), isopentane, n-pentane or cyclopentane, HCFC 141, HFC 245, HFC 365, HFC 134, HFC 227 or a mixture thereof. As is known in the art, water can be used as an indirect or reactive blowing agent in the production of foamed isocyanate-based polymers. Specifically, water reacts with the isocyanate forming carbon dioxide which acts as the effective blowing agent in the final foamed polymer product. Alternatively, the carbon dioxide may be produced by other means such as unstable compounds which yield carbon dioxide (e.g., carbamates and the like). Optionally, direct organic blowing agents may be used in conjunction with water although the use of such blowing agents is generally being curtailed for environmental considerations. The preferred blowing agent for use in the production of the present foamed isocyanate-based polymer comprises water.

It is known in the art that the amount of water used as an indirect blowing agent in the preparation of a foamed isocyanate-based polymer is conventionally in the range of from about 0.5 to as high as about 40 or more parts by weight, preferably from about 1.0 to about 10 parts by weight, based on 100 parts by weight of the total active hydrogen-containing compound content in the reaction mixture. As is known in the art, the amount of water used in the production of a foamed isocyanate-based polymer typically is limited by the fixed properties expected in the foamed polymer and by the tolerance of the expanding foam towards self structure formation. Thus the amount of water may also define the need of isocyanate. If more water is present, the amount of isocyanate needed increases. On the other hand the use of a higher amount of isocyanate may lead to a isocyanate-based polymer foam which is hard and may have a stiff feeling i.e. is "boardy".

Moreover, crosslinking agents, additives like pigments or fillers and other additional components may be added in the mix for isocyanate-based polymers or in the process for producing a foamed isocyanate-based polymer. Although, the derivatized highly branched polysaccharide mainly reacts with the isocyanate, in some embodiments of the invention it can also serve as filler. The crosslinking agent selected from the group consisting of triethanolamine, glycerin and trimethylol propane. In a preferred embodiment of the invention 1-2% diethanolamine by weight of the mix is added to the mixture.

Special additives, such as fillers, flame retarding agents, crosslinking agents and agents for increased durability may be included. Such additives are preferably added in amounts which are common in the art and thus well known to those skilled in the art. Non-limiting examples of such additives include: surfactants (e.g., organo-silicone compounds available under the tradename L-540 produced by Union Carbide), cell openers (e.g., silicone oils), extenders (e.g., halogenated paraffins commercially available as Cereclor S45), cross-linkers (e.g., low molecular weight reactive hydrogen-containing compositions), pigments/dyes, flame retardants (e.g., halogenated organo-phosphoric acid compounds), inhibitors (e.g., weak acids), nucleating agents (e.g., diazo compounds), anti-oxidants, and plasticizers/stabilizers (e.g., sulphonated aromatic compounds). However, a special filler of the present invention comprises the derivatized highly branched polysaccharide which is included in the mix or reaction mixture of the invention.

The isocyanates in the present invention may come from the class of readily available isocyanato aromatic compounds. Depending upon the desired properties, examples of preferred aromatic isocyanates include 2,4 and 2,6 toluene di-isocyanate (TDI) such as that prepared by the phosgenation of toluene diamine produced by the nitration and subsequent hydrogenation of toluene. The TDI may be a mixture of the 2,4 and 2,6 isomers in ratios of either 80:20 or 65:35 with the more preferred being 80:20 (e.g. TDI 80 produced by Lyondell). Another preferred isocyanate is methylene diphenylisocyanate (MDI) such as prepared by the condensation of aniline and formaldehyde with subsequent phosgenation. The MDI may be a mixture of 2,4' and 4,4' methylene diphenyldiisocyanate as well as a mixture of the 2,4 and 4,4 isomers with compounds having more than two aromatic rings—polymeric-MDI or PMDI (e.g. Lupranate® M20S—produced by BASF, PAPI®27—produced by Dow and Mondur®MR produced by Bayer).

The isocyanate suitable for use in the reaction mixture is not particularly restricted and the choice thereof is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g., an alkylene or arylene group). Moreover, Q may be represented by the general formula:

$$Q^1\text{-}Z\text{-}Q^1$$

wherein $Q^1$ is an alkylene or arylene group and Z is chosen from the group comprising —O—, —O-$Q^1$-, —CO—, —S—, —S-$Q^1$-S— and —SO.$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$CH$_2$O)$_2$, 1-methyl-2,4-diisocyanatocy-cyclohexane, phenylene diisocyanates, tolylene diisocyanates, chlorophenylene diisocyanates, 4,4'-methylene diphenyldiisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention may relate to the production of polyurea foams, it will be appreciated that in this embodiment, the prepolymer could be used to prepare a polyurethane modified polyurea.

In another embodiment, the isocyanate compound suitable for use in the process of the present invention may be selected from dimers and trimers of isocyanates and diisocyanates, and from polymeric diisocyanates having the general formula:

$$[Q''(NCO)_i]_j$$

wherein both i and j are integers having a value of 2 or more, and Q" is a polyfunctional organic radical, and/or, as additional components in the reaction mixture, compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides (QSO$_2$NCO), cyanic acid and thiocyanic acid.

See also for example, UK Patent No. 1,453,258, for a discussion of suitable isocyanates. Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-methylene diphenyldiisocyanate, 4,4'-methylene diphenyldiisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane-, polymethylene polyphenyl polyisocyanates and mixtures thereof. A more preferred isocyanate is selected from the group comprising 2,4-toluene diisocyanate, 2,6-toluene iisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group comprising 2,4'-methylene diphenyldiisocyanate, 4,4'-methylene diphenyldiisocyanate and mixtures thereof. The most preferred isocyanate is a mixture comprising from about 15 to about 25 percent by weight 2,4'-methylene diphenyldiisocyanate and from about 75 to about 85 percent by weight 4,4'-methylene diphenyldiisocyanate. In a preferred embodiment of the invention the isocyanate is selected from the group consisting essentially of (i) 2,4'-methylene diphenyldiisocyanate, 4,4'-methylene diphenyldiisocyanate and mixtures thereof, and (ii) mixtures of (i) with an isocyanate selected from the group comprising 2,4-toluene diisocyanate, 2,6-toluene diisocyanate and mixtures thereof.

The ratio of isocyanate groups of the isocyanate and hydroxyl groups of the polyol is from 1.2:1 to 1:1.2, preferably 1.1:1 to 1:1.1.

In a preferred embodiment of the invention the derivatized highly branched polysaccharide of the isocyanate-based polymer is a polydextrose having an active hydrogen functionality of at least 15, which is derivatized with a $C_{8\text{-}12}$-fatty acid to provide a hydrophobicity which renders it compatible with a polyether polyol with which the underivatized polydextrose is incompatible. The isocyanate is selected from the group consisting of 2,4-, 2,6-toluene diisocyanate and methylene diphenyldiisocyanate and combinations thereof, the active hydrogen-containing compound is a polypropylene containing polyether polyol and the blowing agent is water.

In a preferred embodiment of the invention the mix comprises a polyether polyol and a polysaccharide which is a polydextrose having an active hydrogen functionality of at least 15, derivatized with a $C_{8-12}$-fatty acid to provide a hydrophobicity which renders it compatible with a polyether polyol with which the underivatized polydextrose is incompatible.

In another preferred embodiment of the invention the process for producing a foamed isocyanate-based polymer comprises the steps of: contacting an isocyanate selected from 2,4-toluene diisocyanate, 2,6-toluene diisocyanate and methylene diphenyldiisocyanate and combinations thereof, a polypropylene oxide containing polyether polyol, water as blowing agent and a polydextrose to form a reaction mixture; and expanding the reaction mixture to produce the foamed isocyanate-based polymer. The polydextrose is derivatized to provide a hydrophobicity which renders it compatible with a polyether polyol with which the underivatized polydextrose is incompatible.

In another of its aspects, the present invention provides a foamed isocyanate-based polymer derived from an isocyanate and an active hydrogen-containing compound, the polymer having a cellular matrix comprising a plurality of interconnected struts, the active hydrogen-containing compound conferring to the cellular matrix a increased load efficiency.

Preferably the derivatized highly branched polysaccharide is added in an amount sufficient to confer load building to a foamed isocyanate-based polymer. Also in the mix comprising a mixture of an active hydrogen-containing compound and a highly branched polysaccharide, the derivatized polysaccharide is preferably added in an amount sufficient to confer load building to a flexible isocyanate-based polymer. Further also in the process comprising, the steps of: contacting an isocyanate, an active hydrogen-containing compound, a blowing agent and a derivatized highly branched polysaccharide of randomly bonded glucopyranose units, having an average number of 10-100 glucose residues and an active hydrogen functionality of at least 15 to form a reaction mixture, the derivatized highly branched polysaccharide is preferably added in an amount sufficient to confer load building to said flexible isocyanate-based polymer.

In a preferred embodiment of the invention the foamed isocyanate-based polymer has an Indentation Force Deflection loss when measured pursuant to ASTM D3574 which is less than that of a reference foam produced by substituting a copolymer polyol for the derivatized highly branched polysaccharide in the reaction mixture. The foamed isocyanate-based polymer and the reference foam has substantially the same density and Indentation Force Deflection when measured pursuant to ASTM D3574.

The foamed isocyanate-based polymer also has a thickness loss when measured pursuant to ASTM D3574 which is less than that of a reference foam produced by substituting a copolymer polyol for the derivatized highly branched polysaccharide in the reaction mixture. The foamed isocyanate-based polymer and the reference foam has substantially the same density and Indentation Force Deflection when measured pursuant to ASTM D3574.

The following examples are given to further illustrate the invention and are not intended to limit the scope thereof. Based on the above description a person skilled in the art will be able to modify the invention in many ways to provide isocyanate-based polymers of derivatized polysaccharides with a wide range of defined properties.

The following materials are used in Examples 1-17:

E837, base polyol, commercially available from Lyondell;

E850, a 43% solids content copolymer(SAN)polyol, commercially available from Lyondell;

HS100, a 45% solids content graft copolymer (SAN) polyol, commercially available from Bayer;

P975, rigid-type poyol, commercially available from BASF;

718i, a base polyol, similar in characteristics to the carrier polyol used in HS100, commercially available from BASF;

D-PDX, a derivatized highly branched polysaccharide produced according to Example 1 and discussed in more detail in copending U.S. patent application filed on the same day in the name of the same inventors, the title of which is "A derivatized highly branched polysaccharide and a mix for production of polyurethanes thereof;

DEAO LF, diethanolamine, a cross-linking agent commercially available from Air Products;

Glycerin, a cross-linking agent, commercially available from Van Waters & Rogers;

Water, indirect blowing agent;

Dabco 33LV, a gelation catalyst, commercially available from Air Products;

Niax A-1, a blowing catalyst, commercially available from Witco;

PolyCat T12, a catalyst, commercially available from Air Products;

DC 5169, a surfactant, commercially available from Air Products;

Y-10184, a surfactant, commercially available from Witco;

L3812LV, a surfactant, commercially available from Witco OSi;

Papi 27, isoycanate (MDI), commercially available from Dow;

Lupranate T80, isocyanate (TDI), commercially available from BASF.

Unless otherwise stated, all parts reported in the Examples are parts by weight.

EXAMPLES 1 TO 4

The use of a derivatized highly branched polysaccharide in a typical isocyanate-based high resilience (HR) based foam is illustrated.

A mixture of 267 grams of dextrose monohydrate and 30 grams of sorbitol is melted and heated under partial vacuum, with stirring, to 130° C., a solution of 0.3 gram of citric acid in 5 milliliters of water is added, the temperature of the mixture is increased to 152° C., and stirring is continued for 22 minutes under partial vacuum at 152-188° C. The product has a final hydroxyl number of 830. (equivalent wt=68)

25 kg of the highly branched polysaccharide prepared above, 8.4 kg of an aliphatic acid with nine carbon atoms having an acid number of 363 mg KOH/g, 0.1 kg KOH and 3.3 kg of xylene are charged to a reactor equipped with a heating system with accurate temperature control, a mechanical stirrer a pressure gauge, a vacuum pump, a Dean-Stark device for azeotropic removal of water, a cooler, nitrogen inlet and a receiver. The mixture is heated under stirring, with a nitrogen flow of 500-600 l/h through the reaction mixture, from room temperature to 170° C. At this temperature all xylene is refluxing and the reaction water which started to form is removed by azeotropic distillation. The reaction is allowed to continue for a further 12 hours at 170° C., after which the reaction temperature is increased to 180° C. The reaction mixture is kept at this temperature for a further 2.5 hours until an acid value of 6 mg KOH/g is obtained. Full vacuum is then applied to the reactor to remove all xylene from the final product. Approximately 32.4 kg of the derivatized, highly branched polysaccharide is obtained and this product has a hydroxyl value of 545 (equivalent wt=103).

In Examples 1-4, isocyanate-based foams based on the formulations shown in Table 1 are produced by the pre-blending of all resin ingredients including polyols, copolymer polyols, catalysts, water, and surfactants as well as the derivatized highly branched polysaccharide prepared above. The isocyanate is excluded from the reaction mixture and the resin blend and isocyanate are then mixed at an isocyanate index of 100 using a conventional two-stream mixing technique and dispensed into a preheated mold (65° C.) having the dimensions 38.1 cm×38.1 cm×10.16 cm. The mold is then closed and the reaction allowed to proceed until the total volume of the mold is filled. After approximately 6 minutes, the isocyanate-based foam is removed and, after proper conditioning, the properties of interest are measured.

In these Examples, isocyanate-based foams are prepared having a copolymer polyol concentration of 7% (Examples 1 and 3) and 11% (Examples 2 and 4) by weight of resin and having a % $H_2O$ concentration of 3.80% which results in an approximate foam core density of 1.9 pcf. For each level of copolymer polyol concentration, the derivatized highly branched polysaccharide concentration is increased from 2% by weight of resin (Examples 1 and 2) to 5% by weight of resin (Examples 3 and 4).

The density of the foams is reported in Table 1. The Indentation Force Deflection (IFD) at 50% deflection is measured pursuant to ASTM D3574. The introduction of the derivatized highly branched polysaccharide to the isocyanate-based polymer matrix results in a substantial hardness increase for the foams containing 7% copolymer (Examples 1 and 3) and an even greater hardness increase for the foams containing 11% copolymer polyol (Examples 2 and 4).

TABLE 1

| Ingredient | Examples | | | |
|---|---|---|---|---|
| | 1 | 2 | 3 | 4 |
| E837 | 75.0 | 65.6 | 72.1 | 62.8 |
| E850 | 16.4 | 25.7 | 16.3 | 25.6 |
| D-PDX | 2.0 | 2.0 | 5.0 | 5.0 |
| DEOA LF | 0.8 | 0.8 | 0.8 | 0.8 |
| glycerin | 0.5 | 0.5 | 0.5 | 0.5 |
| water | 3.7 | 3.7 | 3.7 | 3.7 |
| Dabco 33LV | 0.5 | 0.5 | 0.5 | 0.5 |
| Niax A-1 | 0.07 | 0.07 | 0.07 | 0.07 |
| DC5169 | 0.04 | 0.04 | 0.04 | 0.04 |
| Y10184 | 1.0 | 1.0 | 1.0 | 1.0 |
| Total Resin | 100.0 | 100.0 | 100.0 | 100.0 |
| Lupranate T80 | 46.3 | 46.3 | 48.0 | 48.0 |
| Index | 100 | 100 | 100 | 100 |
| % water | 3.8 | 3.8 | 3.8 | 3.8 |
| % SAN in resin | 7 | 11 | 7 | 11 |
| % D-PDX in resin | 2 | 2 | 5 | 5 |
| Total dry weight (g) | 470 | 470 | 476 | 480 |
| Density (pcf) | 1.9 | 1.9 | 1.9 | 1.9 |
| 50% IFD (N) | INCREASES -> | | INCREASES -> | |

EXAMPLES 5 TO 8

The use of a derivatized highly branched polysaccharide in a typical isocyanate-based high resilience (HR) based foam is illustrated.

In Examples 5 to 8, isocyanate-based foams based on formulations shown in Table 2 are produced using the process according to Example 1.

In these Examples, isocyanate-based foams are prepared having copolymer polyol concentrations as those used in Examples 1-4 with a % $H_2O$ concentration of 3.2% which results in an approximate core foam density of 2.3 pcf. For each copolymer polyol level used the derivatized highly branched polysaccharide concentration is increased from 2% to 5% by weight of resin.

The introduction of the derivatized highly branched polysaccharide to the isocyanate-based polymer matrix results in a substantial increase in hardness.

TABLE 2

| Ingredient | Examples | | | |
|---|---|---|---|---|
| | 5 | 6 | 7 | 8 |
| E837 | 75.6 | 66.3 | 72.7 | 63.4 |
| E850 | 16.3 | 25.6 | 16.2 | 25.5 |
| D-PDX | 2.0 | 2.0 | 5.0 | 5.0 |
| DEOA LF | 0.9 | 0.9 | 0.9 | 0.9 |
| glycerin | 0.5 | 0.5 | 0.5 | 0.5 |
| water | 3.1 | 3.1 | 3.1 | 3.1 |
| Dabco 33LV | 0.5 | 0.5 | 0.5 | 0.5 |
| Niax A-1 | 0.08 | 0.08 | 0.08 | 0.08 |
| DC5169 | 0.04 | 0.04 | 0.04 | 0.04 |
| Y10184 | 1.0 | 1.0 | 1.0 | 1.0 |
| Total Resin | 100.0 | 100.0 | 100.0 | 100.0 |
| Lupranate T80 | 40.1 | 40.6 | 41.3 | 41.8 |
| Index | 100 | 100 | 100 | 100 |
| % water | 3.2 | 3.2 | 3.2 | 3.2 |
| % SAN in resin | 7 | 11 | 7 | 11 |
| % D-PDX in resin | 2 | 2 | 5 | 5 |
| Total dry weight (g) | 537 | 541 | 543 | 541 |
| Density (pcf) | 2.3 | 2.3 | 2.3 | 2.3 |
| 50% IFD (N) | INCREASES -> | | INCREASES -> | |

EXAMPLES 9 TO 11

The use of a derivatized highly branched polysaccharide in a typical isocyanate-based high resilience (HR) based foam in the absence of any copolymer polyol is illustrated.

In Examples 9 to 11. isocyanate-based foams based on the formulations shown in Table 3 are produced using the process according to Example 1.

In these Examples isocyanate based foams are prepared in the absence of any copolymer polyol. The isocyanate-based foams are formulated with a % $H_2O$ concentration of 3.8% resulting in an approximate foam core density of 1.9 pcf. The level of the derivatized highly branched polysaccharide is varied from 6.7% to 13.4% by weight in the resin.

The introduction of the derivatized highly branched polysaccharide results in a increased foam hardness which increases with an increasing amount of derivatized highly branched polysaccharide. The amounts of derivatized highly branched polysaccharide added are however lower than the amounts of copolymer polyol needed to achieve the same results.

TABLE 3

| Ingredient | Examples | | |
|---|---|---|---|
| | 9 | 10 | 11 |
| E837 | 86.6 | 83.2 | 79.9 |
| E850 | — | — | — |
| D-PDX | 6.7 | 10.1 | 13.4 |
| DEOA LF | 1.0 | 1.0 | 1.0 |
| glycerin | 0.6 | 0.6 | 0.6 |
| water | 3.7 | 3.7 | 3.7 |
| Dabco 33LV | 0.4 | 0.4 | 0.5 |
| Niax A-1 | 0.07 | 0.07 | 0.07 |
| DC5169 | — | — | — |
| Y10184 | 0.9 | 0.9 | 0.9 |
| Total Resin | 100.0 | 100.0 | 100.0 |
| Lupranate T80 | 50.9 | 53.6 | 56.3 |
| Index | 100 | 100 | 100 |
| % water | 3.8 | 3.8 | 3.8 |
| % SAN in resin | 0 | 0 | 0 |
| % D-PDX in resin | 6.7 | 10.0 | 13.4 |
| Total dry weight (g) | 444 | 440 | 441 |
| Density (pcf) | 1.9 | 1.9 | 1.9 |
| 50% IFD (N) | | INCREASES -> | |
| % Hysteresis | | ACCEPTABLE | |
| Load Efficiency | | EXCELLENT | |

EXAMPLES 12 AND 13 (COMPARATIVE)

A typical isocyanate-based high resilience (HR) based foam prepared in the absence of derivatized highly branched polysaccharide is illustrated.

In Examples 12 and 13, isocyanate-based foams based on the formulations shown in Table 4 are produced according to the process of Example 1.

In these Examples, isocyanate based foams are prepared in the absence of any derivatized highly branched polysaccharide. Only copolymer polyol is used to increase foam hardness. Thus, it will be appreciated that Examples 12 and 13 are provided for comparative purposes only and are outside the scope of the present invention. The isocyanate-based foams are formulated with a % H$_2$O concentration of 3.8% resulting in an approximate foam core density of 1.9 pcf. The level of the copolymer polyol is varied from 26% to 8% by weight in the resin.

The introduction of a high amount of the copolymer polyol results in a foam hardness increase. The increase is however not as significant an increase as seen with the derivatized highly branched polysaccharide foams shown in examples 9 to 11.

TABLE 4

| Ingredient | Examples | |
|---|---|---|
| | 12 | 13 |
| E837 | 32.6 | 74.7 |
| E850 | 60.9 | 18.7 |
| D-PDX | — | — |
| DEOA LF | 1.0 | 1.0 |
| glycerin | 0.6 | 0.6 |
| water | 3.7 | 3.7 |
| Dabco 33LV | 0.3 | 0.3 |
| Niax A-1 | 0.07 | 0.07 |
| DC5169 | — | — |
| Y10184 | 0.9 | 0.9 |
| Total Resin | 100.0 | 100.0 |
| Lupranate T80 | 38.1 | 38.7 |
| Index | 100 | 100 |
| % water | 3.8 | 3.8 |
| % SAN in resin | 26 | 8 |
| % D-PDX in resin | 0 | 0 |
| Total dry weight (g) | 514 | 519 |
| Density (pcf) | 1.9 | 1.9 |
| 50% IFD (N) | DECREASES -> | |
| % Hysteresis | ACCEPTABLE | |
| Load Efficiency | ACCEPTABLE | |

EXAMPLES 14 TO 17

In these Examples, isocyanate based foams are prepared having decreasing amounts of graft copolymer polyol and increasing amounts of derivatized highly branched polysaccharide.

In Examples 14-17, various foams are produced according to the process of Example 1 and the formulations set out in Table 5. In these Examples, isocyanate based foams are prepared having decreasing amounts of graft copolymer polyol (HS100) from 88 parts per hundred parts polyol (pphp) in Example 14 to 50 pphp in Example 17. HS 100 is a conventional polyol (not an HR polyol as in the other examples) with a very high styrene-acrylonitrile copolymer level. To compensate for the expected loss in hardness/stiffness of the isocyanate based foam with decreasing amount of HS 100, the derivatized highly branched polysaccharide (D-PDX) is added in increasing amounts from 8 pphp in Example 15 to 17 pphp in Example 17. A conventional polyether polyol, 718i, is added to maintain the overall level of polyhydroxy compounds in the formulation. The total H$_2$O in the polyol side is 3.4%.

The effect of the addition of the derivatized highly branched polysaccharide to the isocyanate based foam is increasing for the higher amount of polysaccharide.

TABLE 5

| Ingredient | Examples | | | |
|---|---|---|---|---|
| | 14 | 15 | 16 | 17 |
| HS100 | 83.1 | 66.1 | 57.4 | 47.9 |
| P975 | 11.3 | 11.3 | 11.5 | 11.5 |
| D-PDX | — | 7.6 | 12.0 | 16.3 |
| 718i | — | 9.4 | 14.7 | 20.1 |
| L3812LV | 1.7 | 1.7 | 1.7 | 1.7 |
| water | 3.4 | 2.6 | 2.2 | 1.8 |
| Niax A-1 | 0.4 | 0.4 | 0.4 | 0.4 |
| T-12 | 0.08 | 0.08 | 0.08 | 0.08 |
| Total Resin | 100.0 | 100.0 | 100.0 | 100.0 |
| PAPI 27 | 82.2 | 92.6 | 99.6 | 105.6 |
| Index | 120 | 120 | 120 | 120 |
| % SAN | 37.4 | 30.0 | 25.8 | 21.5 |
| % D-PDX | — | 6.9 | 10.8 | 14.6 |
| % water | 3.4 | 3.4 | 3.4 | 3.4 |
| Density (pcf) | 2.1 | 2.3 | 2.3 | 2.4 |
| 10% CFD (psi) | | INCREASES -> | | |
| Flex DIsp. @ yield (mm) | | UNAFFECTED | | |

Generally, the use of conventional techniques to increase hardness/stiffless in rigid/semi-rigid polyurethane foam causes a corresponding decrease in the flexible properties. Surprisingly, in Examples 14-17, as the CFD hardness increases with increasing amounts of the D-PDX, the flexural displacement at yield is largely unaffected. Hence, it is clear that, with the use of the derivatized highly branched polysaccharide (D-PDX), large increases in CFD hardness are possible while maintaining the flexibility of the foam almost constant.

EXAMPLES 18-32

Examples 18-32 illustrate the use of a polydextrose derivatives or copolymer polyols (comparative examples), in a typical isocyanate based high resilient (HR) based foam.

In each Example, the isocyanate based foams based on the formulations shown in Table 6 and 7 were prepared by the pre-blending of all resin ingredients including polyols, copolymer polyols (if used), catalysts, water, and surfactants as well as the derivatized highly branched polysaccharide of interest (if used). The isocyanate was excluded from the mixture. The resin blend and isocyanate were then mixed in a free rise cup at an isocyanate index as indicated in tables 6 and 7 using a high speed dispersator. The foam was allowed to rise freely at room temperature and the cups were moved to an oven (50° C.) for 1 hour where after the properties of interest were measured. The methodology will be referred to in Examples 18-27 as the General Procedure.

In Examples 28-32 a 10% solution of the highly branched polysaccharide in HR polyol Hyperlite E 863 was prepared as follows. 20 g of the highly branched polysaccharide was dissolved in 180 g of acetone and this solution was added to 180 g of E 863. The acetone was removed on a rotary evaporator leaving a 10% solution of the highly branched polysaccharide in polyol. For foaming evaluations, the 10% highly branched polysaccharide polyol solution was further diluted to a 5% solution by adding additional Hyperlite E 863. Further, the isocyanate based foams based on the formulations of Examples 28-32 were prepared by the pre-blending of all resin ingredients and finally the isocyanate as stated above for Examples 18-27.

In Examples 18-32, the following materials are used:
E863, base polyol, commercially available from Lyondell;
E850, a 43% solids content copolymer (SAN) polyol, commercially available from Lyondell;
D-PDX, polydextrose derivatives produced as presented below;
DEAO LF, diethanol amine, a crosslinking agent commercially available from Air Products;
Water, indirect blowing agent;
Dabco 33LV, a gelation catalyst, commercially available from Air Products;
Niax A-I, a blowing catalyst, commercially available from Witco;
Niax L-3184 a silicon surfactant manufactured by GE
Dabco 5164 a silicon surfactant manufactured by Air Products
Dabco 5043 a silicon surfactant manufactured by Air Products Lupranate T80, isocyanate (toluene diisocyanate—TDI), commercially available from BASF.

Unless otherwise stated, all parts reported in Examples 18-32 are in parts by weight.

The polydextrose derivatives of Examples 22-32 were produced as stated below. For Examples 28-32 the synthetic procedure was modified in an attempt to reduce the acid number. The alteration consisted of precipitating the reaction product in a basic sodium bicarbonate solution instead of water.

THE POLYDEXTROSE ESTER OF EXAMPLE 22 AND 23

(Theoretical Level of Hydroxyl Replacement~40%)

200 g DMF, 19.75 g (0.25 eq) pyridine and 34 g (0.5 eq) of polydextrose (vacuum dried overnight at 80° C.) was placed in a 1 liter 4 necked flask equipped with a top mechanical stirrer, reflux condenser and an additional funnel. The mixture was heated to 70° C. and during that time all of the polydextrose went into solution. Next 38.1 g (0.2 eq) of decanoyl chloride was added dropwise over a 0.75 hour period and during the addition, the temperature rose to 91° C.

Next 400 ml of water was added leading to a gummy precipitate. After cooling in a freezer, the water was decanted away and the gummy solid was washed 2 times with 200 ml of water. The water was decanted away and the dough like solid placed in a vacuum oven at 70° C. and dried. 60.13 g of product resulted (~140% yield). Apparently, the by-product pyridine hydrochloride was trapped in with the product. The product was washed again with water and dried but still most of the pyridine hydrochloride remained. The solid was then mixed with water and heated to 60° C. and the stickiness seemed to go away. It was filtered and washed again filtered and dried under vacuum. 52.3 g of product resulted (80.7% yield) which had a hydroxyl value of 372.

THE POLYDEXTROSE ESTER OF EXAMPLE 24 AND 25

(Theoretical Level of Hydroxyl Replacement~50%)

200 g dimethyl sulfoxide (DMSO), 55.4 g (0.7 eq) and 34 g (0.5 eq) of polydextrose (vacuum dried overnight at 80° C.) was placed in a 1 liter 4 necked flask equipped with a top mechanical stirrer, reflux condenser and an additional funnel. The mixture was heated to 90° C. and then 20 g of sodium bicarbonate was added followed by 29.7 (0.15 equivalents) of vinyl neodecanoate over 5 minutes and the mixture was heated for 4 hour. No substantial reaction seemed to have occurred (aliquot addition to water with almost no precipitate) so additional sodium bicarbonate (20 g) was added followed by an additional 19.1 g (0.1 eq) of vinyl neodecanoate. The mixture was gradually heated. to 160° C. over a 5 hour period.

After cooling, 600 ml of water was added leading to a gummy precipitate. After cooling in a freezer, the water was decanted away and the gummy solid was washed 2 times with 300 ml of water. The water was decanted away and the dough like solid placed in a vacuum oven at 70° C. and dried. 47.8 g of product resulted (~66% yield) which had a hydroxyl value of 319.

THE POLYDEXTROSE ESTER OF EXAMPLE 26

(Theoretical Level of Hydroxyl Replacement~60%)

400 g DMF, 55.4 g (0.7 eq) pyridine and 68 g (1.0 eq) of polydextrose (vacuum dried overnight at 80° C.) was placed in a 1 liter 4 necked flask equipped with a top mechanical stirrer, reflux condenser and an additional funnel. The mixture was heated to 70° C. and during that time all of the polydextrose went into solution. Next 65.1 g (0.4 eq) of octanoyl chloride was added dropwise over 15 minutes, and next the mixture was to 90° C. and held there for 1 hour.

Next 800 ml of water was added leading to a gummy precipitate. After cooling in a freezer, the water was decanted away and the gummy solid was washed 2 times with 400 ml of water. The water was decanted away and the dough like solid placed in a vacuum oven at 70° C. and dried. 135.5 g of product resulted (~94.3% yield) which had a hydroxyl value of 258.

THE POLYDEXTROSE ESTER OF EXAMPLE 27

(Theoretical Level of Hydroxyl Replacement~60%)

400 g DMF, 55.4 g (0.7 eq) pyridine and 68 g (1.0 eq) of polydextrose (vacuum dried overnight at 80° C.) was placed in a 1 liter 4 necked flask equipped with a top mechanical stirrer, reflux condenser and an additional funnel. The mixture was heated to 70° C. and during that time all of the polydextrose went into solution. Next 114.4 g (0.6 eq) of decanoyl chloride was added dropwise over 15 minutes and next the mixture was to 90° C. and held there for 1 hour.

Next 800 ml of water was added leading to a gummy precipitate. After cooling in a freezer, the water was decanted away and the gummy solid was washed 2 times with 400 ml of water. The water was decanted away and the dough like solid placed in a vacuum oven at 70° C. and dried. 157.8 g of product resulted (~90.3% yield) which had a hydroxyl value of 229.

THE POLYDEXTROSE ESTER OF EXAMPLE 28, 29 AND 30

(Theoretical Level of Hydroxyl Replacement~60%)

400 g DMF, 55.4 g (0.7 eq) pyridine and 68 g (1.0 eq) of polydextrose (vacuum dried overnight at 80° C.) was placed in a 1 liter 4 necked flask equipped with a top mechanical stirrer, reflux condenser and an additional funnel. The mixture was heated to 70° C. and during that time all of the polydextrose went into solution. Next 114.4 g (0.6 eq) of decanoyl chloride was added dropwise over a 0.25 hour period and during the addition, the temperature rose to 85° C. Next the temperature was raised to 90° C. and held at this temperature for 1 hour.

The hot reaction mixture was added to 800 ml water with 0.67 g of sodium bicarbonate (0.01N) and stirred thoroughly. After cooling the water/base was decanted away and the gummy solid was washed with 400 ml of 0.01N sodium bicarbonate solution. The wash solution was still acidic (pH paper) so incrementally an additional 0.4 g of sodium bicarbonate was added until the wash solution remained basic to pH paper. (A total of 2 g of sodium bicarbonate was added). The gummy solid was washed 4 times with 400 ml water until the wash water remained neutral to pH paper. The water was decanted away and the gummy solid placed in a vacuum oven at 70° C. and dried. The weight of dried product was 151.7 g for a yield of 97.9%. The dried product had an OH #=232 and an acid number=33. The weight % polydextrose in this derivative=51.

THE POLYDEXTROSE ESTER OF EXAMPLE 31 AND 32

(Theoretical Level of Hydroxyl Replacement~60%)

400 g DMF, 55.4 g (0.7 eq) pyridine and 68 g (1.0 eq) of polydextrose (vacuum dried overnight at 80° C.) was placed in a 1 liter 4 necked flask equipped with a top mechanical stirrer, reflux condenser and an additional funnel. The mixture was heated to 70° C. and during that time all of the polydextrose went into solution. Next 97.6 g (0.6 eq) of octanoyl chloride was added dropwise over a 0.25 hour period and during the addition, the temperature rose to 85° C. Next the temperature was raised to 90° C. and held at this temperature for 1 hour.

The hot reaction mixture was added to 800 ml water with 3.5 g of sodium bicarbonate and stirred thoroughly. The wash solution was still acidic (pH paper) so incrementally an additional 0.4 g of sodium bicarbonate was added until the wash solution remained basic to pH paper. (A total of 3.2 g of sodium bicarbonate was added). The gummy solid was washed 4 times with 400 ml water until the wash water remained neutral to pH paper. The water was decanted away and the gummy solid placed in a vacuum oven at 70° C. and dried. The weight of dried product was 123.1 g for a yield of 85.6%. The weight of dried product was 151.7 g for a yield of 97.9%. The dried product had an OH #=244 and an acid number=15. The weight % polydextrose in this derivative=54.

The isocyanate based foams based on the formulations shown in Table 6 and 7 were produced using the processes and the General procedure referred to above.

The results of physical property testing for each foam was the density and Compressive Load Deflection (CLD) at 50% deflection or 25%, 50% and 65% deflection, measured pursuant to ASTM D3574 Test C, which is a good screening test for small foam samples. The CLD values are given in pounds per square inch (psi). The force in pounds needed to compress the sample was recorded and the result are reported in psi by dividing the force by the surface area of the sample. The CLD determination was run at 50% compression for the samples of Examples 22-27 and at 25%, 50% and 65% compression for the samples of Examples 18-21 and 28-32. Samples with nominal dimensions of 2"x2"x1" were prepared.

The derivatives of Examples 28-32 appeared to foam better than their predecessors, which indicate that foam stability is related to acid number and the level of hydroxyl group substitution on polydextrose. In these examples a substitution level of at least 40% gave good foaming performance.

TABLE 6

| | Control foams | | | | | | | |
| --- | --- | --- | --- | --- | --- | --- | --- | --- |
| | Examples | | | | | | | |
| Ingredient | 18 A | 18 B | 19 A | 19 B | 20 A | 20 B | 21 A | 21 B |
| Hyperlite E 863 | 90 | 90 | 80 | 80 | 60 | 60 | 40 | 40 |
| Hyperlite E 850 | 10 | 10 | 20 | 20 | 40 | 40 | 60 | 60 |
| D-PDX | | | | | | | | |
| DEOA LF | 1.6 | 1.6 | 1.6 | 1.6 | 1.6 | 1.6 | 1.6 | 1.6 |
| water | 3.93 | 3.93 | 3.93 | 3.93 | 3.93 | 3.93 | 3.93 | 3.93 |
| Dabco 33LV | 0.33 | 0.33 | 0.33 | 0.33 | 0.33 | 0.33 | 0.33 | 0.33 |
| Niax A-1 | 0.08 | 0.08 | 0.08 | 0.08 | 0.08 | 0.08 | 0.08 | 0.08 |

TABLE 6-continued

Control foams

| | Examples | | | | | | | |
|---|---|---|---|---|---|---|---|---|
| Ingredient | 18 A | 18 B | 19 A | 19 B | 20 A | 20 B | 21 A | 21 B |
| Niax L-3184 | 1 | 1 | 1 | 1 | 1 | 1 | 1 | 1 |
| Total Resin | 106.94 | 106.94 | 106.94 | 106.94 | 106.44 | 106.44 | 106.44 | 106.44 |
| TDI 80 | 46.65 | 46.65 | 46.48 | 46.48 | 46.13 | 46.13 | 45.79 | 45.79 |
| Index | 1.0 | 1.0 | 1.0 | 1.0 | 1.0 | 1.0 | 1.0 | 1.0 |
| Mix | 5 | 5 | 5 | 5 | 5 | 5 | 5 | 5 |
| Initiation | 10 | 10 | 10 | 10 | 10 | 10 | 10 | 10 |
| Gel | 80 | 80 | 80 | 80 | 80 | 80 | 75 | 75 |
| Rise | 80 | 80 | 80 | 80 | 80 | 80 | 75 | 75 |
| Density (pcf) | 1.97 | 1.99 | 1.97 | 2.09 | 1.73 | 1.77 | 1.74 | 1.80 |
| 25% CLD (psi) | 0.28 | 0.27 | 0.31 | 0.36 | 0.38 | 0.35 | 0.45 | 0.56 |
| 50% CLD (psi) | 0.42 | 0.41 | 0.50 | 0.53 | 0.59 | 0.57 | 0.75 | 0.83 |
| 65% CLD (psi) | 0.73 | 0.71 | 0.81 | 0.81 | 0.76 | 0.99 | 1.28 | 1.36 |
| 65:25 ratio | 2.6 | 2.7 | 2.6 | 2.3 | 2.0 | 2.8 | 2.9 | 2.4 |

In examples 18-21, isocyanate based foams were prepared in the absence of any derivatized highly branched polysaccharide. Copolymer polyol was used to increase foam hardness. Thus, it will be appreciated that Examples 18-21 are provided for comparative purposes only and are outside the scope of the present invention.

The isocyanate based foams were formulated with a $H_2O$ concentration of 3.93% resulting in an approximate foam core density of 1.7-2.09 pcf. In order to compare the CLD's of the different foams, one needs to have comparable densities. Two pairs of polymer polyol controls of Example 18 and 19 all have a nominal 2.0 lb/ft³ density. The samples with 20% POP (~8.6% solids) have a 50% CLD of about 0.52 psi versus 0.41 for the 10% POP (~4.3% solids). The higher solids POP foams of Example 20 [17.2%] and 21 [25.8%]) show increased 50% CLD (0.58 and 0.79 psi respectively) even at a density slightly below 1.8 lb/ft³. Most control foams exhibit a 65:25 ratio greater than 2.4, which is an indication that these foams can be classified as high resilience foams.

TABLE 7

| | Examples | | | | | | | |
|---|---|---|---|---|---|---|---|---|
| Ingredient | 22 A | 22 B | 23 A | 23 B | 24 A | 24 B | 25 A | 25 B |
| Hyperlite E 863 | 95 | 95 | 97 | 97 | 95 | 95 | 97.5 | 97.5 |
| Hyperlite E 850 | | | | | | | | |
| D-PDX | 5 | 5 | 3 | 3 | 5 | 5 | 2.5 | 2.5 |
| DEOA LF | 2.4 | 2.4 | | | 2 | 2 | 2 | 2 |
| water | 3.93 | 3.93 | 3.93 | 3.93 | 3.93 | 3.93 | 3.93 | 3.93 |
| Dabco 33LV | 0.33 | 0.33 | 0.33 | 0.33 | 0.33 | 0.33 | 0.33 | 0.33 |
| Niax A-1 | 0.08 | 0.08 | 0.08 | 0.08 | 0.08 | 0.08 | 0.08 | 0.08 |
| Dabcon 5164 | 1 | 1 | 1 | 1 | 1 | 1 | 1 | 1 |
| Niax 3184 | | | | | 3 | 3 | 3 | 3 |
| TDI 80 | 46.3 | 46.3 | 46.0 | 46.0 | 49.2 | 49.2 | 49.2 | 49.2 |
| Index | 0.86 | 0.86 | 0.91 | 0.91 | 0.98 | 0.98 | 1.0 | 1.0 |
| Mix | 5 | 5 | 5 | 5 | 5 | 5 | 5 | 5 |
| Initiation | 10 | 10 | 12 | 12 | 10 | 10 | | |
| Gel | 75 | 75 | 75 | 75 | 40 | 40 | 40 | 40 |
| Rise | 60 | 60 | 75 | 75 | 40 | 40 | 35 | 35 |
| Density (pcf) | 1.97 | 1.88 | 2.27 | 2.34 | 2.02 | 2.24 | 2.29 | 2.22 |
| 50% CLD (psi) | 0.70 | 0.57 | 0.83 | 0.95 | 0.66 | 0.84 | 0.60 | 0.31 |

| | Examples | | | | | | |
|---|---|---|---|---|---|---|---|
| Ingredient | 26 | 27 | 28 | 29 | 30 | 31 | 32 |
| Hyperlite E 863 | 95 | 95 | 95 | 95 | 95 | 95 | 95 |
| Hyperlite E 850 | | | | | | | |
| D-PDX | 5 | 5 | 5 | 5 | 5 | 5 | 5 |
| DEOA LF | 2.4 | 2.4 | 2.4 | 2.4 | 2.4 | 2.4 | 2.4 |
| water | 3.93 | 3.93 | 3.93 | 3.4 | 3.93 | 3.4 | 3.4 |
| Dabco 33LV | 0.33 | 0.33 | 0.33 | 0.33 | 0.33 | 0.33 | 0.33 |
| Niax A-1 | 0.08 | 0.08 | 0.08 | 0.08 | 0.08 | 0.08 | 0.08 |
| Dabco 5164 | | | | | | 0.8 | |
| Dabco 5043 | | | 1.0 | | 1.0 | | |
| Niax L-3184 | 1.4 | 1.4 | | 1.0 | | | 0.8 |
| TDI 80 | 50.2 | 50.45 | 50.45 | 45.2 | 50.45 | 45.3 | 45.3 |
| Index | 1 | 1 | 1 | 1 | 1 | 1 | 1 |
| Mix | 5 | 5 | 5 | 5 | 5 | 5 | 5 |

TABLE 7-continued

| Initiation | 11 | 14 | 15 | 14 | 14 | 12 | 12 |
|---|---|---|---|---|---|---|---|
| Gel | 60 | 105 | 90 | 90 | 100 | 80 | 80 |
| Rise | 75 | 90 | 120 | 90 | 120 | 90 | 90 |
| Density (pcf) | 1,87 | 1,58 | 2.00 | 1.97 | 1.94 | 1.97 | 1.88 |
| 25% CLD (psi) | 0.47 | 0.36 | 0.39 | 0.35 | 0.45 | 0.39 | 0.34 |
| 50% CLD (psi) | 0.75 | 0.57 | 0.65 | 0.58 | 0.73 | 0.59 | 0.52 |
| 65% CLD (psi) | 1.33 | 1.03 | 1.15 | 1.00 | 1.35 | 1.01 | 0.88 |
| 65:25 ratio | 2.88 | 2.86 | 2.95 | 2.82 | 3.03 | 2.60 | 2.58 |

The Formulation of Example 22 has an average density of 1.95 lb/ft³ and an average 50% CLD of~0.64 psi. This CLD is higher than either of the comparable density POP foams with either 4.3 or 8.6% solids, although a smaller amount of derivatized highly branched polydextrose is used. Similarly the formulation of Example 24 has a slightly higher average density of 2.13 lb/ft³ and an average 50% CLD of 0.75. Another direct comparison of two different polydextrose dendrimers can be made with the formulation of example 24 A and of example 22 A (~1.97 lb/ft³). The lower density of the formulation of example 22 A has only a slightly higher 50% CLD (0.70 psi) than that of the formulation of example 24 A (0.66 psi).

Moreover, the formulations of example 24B and 25A may be compared since their density is almost the same. The CLD value is lower for 25A which indicates that the hardness is improved with the increase of the amount of derivatized highly branched polysaccharide.

Compared with the control foams, the polydextrose-based foams of Examples 26 and 27, exhibit a 50% CLD value of at least 0.5 psi even though the densities are lower than 2.0 pcf. Thus the load bearing of these 5% derivatized-polydextrose-based foam is greater than the load bearing achievable from polymer polyol having a higher solids content and higher density, for example the control foams of Example 19A and 19B.

All of the foams based on the octyl and decyl modified polydextrose of Examples 28-32 have 65:25 ratios above 2.4, which is an indication that these foams can be classified as high resilience foams. The value of 50% CLD for these foams of Examples 28-32 range from 0.52 to 0.73 psi. At 5% derivatized-polydextrose-based loading, this represents greater load bearing than the control foams of Example 18A, 18B and 19A which were 10% and 20% polymer polyol derived foams, respectively.

While[JS1] this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application is specifically and individually indicated to be incorporated by reference in its entirety.

The invention claimed is:

1. A foamed isocyanate-based polymer derived from a reaction mixture comprising an isocyanate, an active hydrogen-containing compound, a blowing agent and a highly branched polysaccharide of randomly bonded glucopyranose units, having an average number of 10-100 glucose residues and an active hydrogen functionality of at least 15 wherein said polysaccharide is derivatized to provide a hydrophobicity which renders it compatible with a polyether polyol with which the underivatized polysaccharide is incompatible.

2. The isocyanate-based polymer of claim 1, wherein said hydrophobicity of said derivatized polysaccharide is sufficient to cause a compatibility indicating mixture of said derivatized polysaccharide and said polyether polyol with which the underivatized polysaccharide is incompatible, said compatibility indicating mixture comprising at least 5% (w/w) of said derivatized polysaccharide, to form a uniform liquid at 23° C.

3. The isocyanate-based polymer of claim 2, wherein said compatibility indicating mixture comprising 5 to 50% of the derivatized polysaccharide forms a uniform liquid at 23° C.

4. The isocyanate-based polymer of claim 3, wherein said compatibility indicating mixture comprising 5 to 40% of the derivatized polysaccharide forms a uniform liquid at 23° C.

5. The isocyanate-based polymer of claim 3, wherein said compatibility indicating mixture comprising 5 to 30% of the derivatized polysaccharide forms a uniform liquid at 23° C.

6. The isocyanate-based polymer of claim 1, wherein said derivatized highly branched polysaccharide has an active hydrogen functionality of 15 to 70.

7. The isocyanate-based polymer of claim 6, wherein said derivatized highly branched polysaccharide has an active hydrogen functionality of 20 to 60.

8. The isocyanate-based polymer of claim 6, wherein said derivatized highly branched polysaccharide has an active hydrogen functionality of 30 to 50.

9. The isocyanate-based polymer of claim 1, wherein said derivatized highly branched polysaccharide has a solubility parameter below 14.

10. The isocyanate-based polymer of claim 1, wherein said derivatized highly branched polysaccharide has a solubility parameter below 12.

11. The isocyanate-based polymer of claim 1, wherein said polysaccharide is derivatized by a chemical reaction with an organic compound comprising 6-20 carbon atoms selected from aliphatic and aromatic carbon atoms and combinations thereof.

12. The isocyanate-based polymer of claim 11, wherein said organic compound is selected from $C_6$-$C_{12}$ carboxylic acids and $C_6$-$C_{12}$ organic alcohols.

13. The isocyanate-based polymer of claim 12, wherein said carboxylic acid is selected from fatty acids or reactive derivatives thereof.

14. The isocyanate-based polymer of claim 13, wherein the weight of fatty acid residues is 5 to 50% based on the weight of the derivatized highly branched polysaccharide.

15. The isocyanate-based polymer of claim 14, wherein the weight of fatty acid residues is 15 to 40% based on the weight of the derivatized highly branched polysaccharide.

16. The isocyanate-based polymer of claim 1, wherein said polyether polyol with which the underivatized polysaccharide is incompatible comprises at least 50% polypropylene oxide.

17. The isocyanate-based polymer of claim 1, wherein the polyether polyol with which the underivatized polysaccharide is incompatible has a molecular weight in the range of from about 200 to about 12,000.

18. The isocyanate-based polymer of claim 17, wherein the polyether polyol with which the underivatized polysaccharide is incompatible has a molecular weight in the range of from about 2,000 to about 7,000.

19. The isocyanate-based polymer of claim 1, wherein said polyether polyol with which the underivatized polysaccharide is incompatible has a hydroxyl value of at most 60 mg KOH/g.

20. The isocyanate-based polymer of claim 19, wherein said polyether polyol with which the underivatized polysaccharide is incompatible has a hydroxyl value of 15 to 55 mg KOH/g.

21. The isocyanate-based polymer of claim 19, wherein said polyether polyol with which the underivatized polysaccharide is incompatible has a hydroxyl value of 28 to 36 mg KOH/g.

22. The isocyanate-based polymer of claim 1, wherein the active hydrogen-containing compound is selected from the group comprising polyols, polyamines, polyamides, polyimines and polyamines.

23. The isocyanate-based polymer of claim 22, wherein the active hydrogen-containing compound comprises a polyol.

24. The isocyanate-based polymer of claim 23, wherein the polyol is a polyether polyol.

25. The isocyanate-based polymer of claim 24, wherein said polyol comprising polyether polyol contains polypropylene oxide.

26. The isocyanate-based polymer of claim 24, wherein said polyol comprising polyether polyol has a functionality of at least 2.

27. The isocyanate-based polymer of claim 24, wherein said polyol comprising polyether polyol has a molecular weight in the range of from about 200 to about 12,000.

28. The isocyanate-based polymer of claim 27, wherein said polyol comprising polyether polyol has a molecular weight in the range of from about 2,000 to about 7,000.

29. The isocyanate-based polymer of claim 24, wherein said polyether polyol of said reaction mixture is the same as the polyether polyol of the compability indicating mixture.

30. The isocyanate-based polymer of claim 24, wherein said polyether polyol of said reaction mixture is different from the polyether polyol of the compability indicating mixture.

31. The isocyanate-based polymer of claim 1, wherein said foamed isocyanate-based polymer is flexible polyurethane foam.

32. The isocyanate-based polymer of claim 23, wherein the ratio of isocyanate groups of said isocyanate and hydroxyl groups of said polyol is from about 1.2:1 to 1:1.2.

33. The isocyanate-based polymer of claim 32, wherein the ratio of isocyanate groups of said isocyanate and hydroxyl groups of said polyol is from about 1.1:1 to 1:1.1.

34. The isocyanate-based polymer of claim 1, wherein the isocyanate is represented by the general formula: $Q(NCO)_i$ wherein i is an integer of two or more and Q is an organic radical having the valence of i.

35. The isocyanate-based polymer of claim 34, wherein the isocyanate is selected from the group consisting of hexamethylene diisocyanate, 1,8-diisocyanato-p-methane, xylyl diisocyanate, $(OCNCH_2CH_2CH_2O)_2$, 1-methyl-2,4-diisocyanatocyclohexane, phenylene diisocyanates, tolylene diisocyanates, chlorophenylene diisocyanates, 4,4'-methylene-diphenyldiisocyanate, naphthalene-1,5-diisocyanate, triphenylmethane-4,4',4"-triisocyanate, isopropylbenzene-alpha-4-diisocyanate and mixtures thereof.

36. The isocyanate-based polymer of claim 1, wherein the isocyanate comprises a prepolymer.

37. The isocyanate-based polymer of claim 1, wherein isocyanate is selected from the group consisting of 1,6-hexamethylene diisocyanate, 1,4-butylene diisocyanate, furfurylidene diisocyanate, 2,4-toluene diisocyanate, 2,6-toluene diisocyanate, 2,4'-methylene diphenyldiisocyanate, 4,4'-methylene diphenyldiisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanate cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl) methane-, polymethylene polyphenyl polyisocyanates and mixtures thereof.

38. The isocyanate-based polymer of claim 37, wherein the isocyanate is selected from the group consisting of (i) 2,4'-methylene diphenyidiisocyanate, 4,4'-methylene diphenyidiisocyanate and mixtures thereof; and (ii) mixtures of(i) with an isocyanate selected from the group consisting of 2,4-toluene diisocyanate, 2,6-toluene diisocyanate and mixtures thereof.

39. The isocyanate-based polymer of claim 1, wherein the isocyanate is polymeric methylene diphenyldiisocyanate.

40. The isocyanate-based polymer of claim 1, wherein said blowing agent is selected from water, non-water blowing agents, liquid carbon dioxide and combinations thereof.

41. The isocyanate-based polymer of claim 40, wherein said non-water blowing agents are low-boiling organic liquids.

42. The isocyanate-based polymer of claim 1, wherein said blowing agent comprises water.

43. The isocyanate-based polymer of claim 1, wherein said reaction mixture further comprises at least one catalyst and at least one surfactant.

44. The isocyanate-based polymer of claim 43 wherein said catalyst is selected from the group consisting of tertiary amines and metallic salts or mixtures thereof.

45. The isocyanate-based polymer of claim 43 wherein said surfactant is selected from the group consisting of silicone surfactants.

46. The isocyanate-based polymer of claim 1 wherein said reaction mixture further comprises crosslinking agents and additives.

47. The isocyanate-based polymer of claim 1, wherein said highly branched polysaccharide which is derivatized is added in an amount sufficient to confer load building to said foamed isocyanate-based polymer.

48. The isocyanate-based polymer of claim 1, wherein said foamed isocyanate-based polymer has an Indentation Force Deflection loss when measured pursuant to ASTM D3574 which is less than that of a reference foam produced by substituting a copolymer polyol for the derivatized highly branched polysaccharide in the reaction mixture, the foamed isocyanate-based polymer and the reference foam having substantially the same density and Indentation Force Deflection when measured pursuant to ASTM D3574.

49. The isocyanate-based polymer of claim 1, wherein said foamed isocyanate-based polymer has thickness loss when measured pursuant to ASTM D3574 which is less than that of a reference foam produced by substituting a copolymer polyol for the derivatized highly branched polysaccharide in the reaction mixture, the foamed isocyanate-based polymer and the reference foam having substantially the same density and Indentation Force Deflection when measured pursuant to ASTM D3574.

50. The isocyanate-based polymer of claim 1, wherein said isocyanate is selected from the group consisting of 2,4-toluene diisocyanate, 2,6-toluene diisocyanate and methylene diphenyldiisocyanate and combinations thereof, the active hydrogen-containing compound is a polypropylene oxide containing polyether polyol, the blowing agent is water and said derivatized polysaccharide is a polydextrose having an active hydrogen functionality of at least 15, derivatized with a $C_{8-12}$-fatty acid to provide a hydrophobicity which renders it compatible with a polyether polyol with which the underivatized polydextrose is incompatible.

51. A mix for the production of a foamed isocyanate-based polymer comprising a mixture of an active hydrogen-containing compound and a highly branched polysaccharide of randomly bonded glucopyranose units, having an average number of 10-100 glucose residues, wherein said polysaccharide has an active hydrogen functionality of at least 15 and is derivatized to provide a hydrophobicity which renders it compatible with a polyether polyol with which the underivatized polysaccharide is incompatible.

52. The mix of claim 51, wherein said mix comprises 1 to 50% by weight of said derivatized polysaccharide.

53. The mix of claim 52, wherein said mix comprises 5 to 20% by weight of said derivatized polysaccharide.

54. The mix of claim 52, wherein said mix comprises 10 to 15% by weight of said derivatized polysaccharide.

55. The mix of claim 51, wherein said derivatized highly branched polysaccharide has an active hydrogen functionality of 15 to 70.

56. The mix of claim 1, wherein said derivatized highly branched polysaccharide has a solubility parameter below 14.

57. The mix of claim 51, wherein said hydrophobicity of said derivatized polysaccharide is sufficient to cause a compatibility indicating mixture of said polysaccharide and said polyether polyol with which the underivatized polysaccharide is incompatible, said compatibility indicating mixture comprising at least 5% (w/w) of said derivatized polysaccharide to form a uniform liquid at 23° C.

58. The mix of claim 57, wherein said compatibility indicating mixture comprising 5 to 50% of the derivatized polysaccharide forms a uniform liquid at 23° C.

59. The mix of claim 51, wherein said polysaccharide is derivatized by a chemical reaction with an organic compound comprising 6-20 carbon atoms selected from aliphatic and aromatic carbon atoms and combinations thereof.

60. The mix of claim 59, wherein said organic compound is selected from $C_6$-$C_{12}$ carboxylic acids and $C_6$-$C_{12}$ organic alcohols.

61. The mix of claim 60, wherein said carboxylic acid is selected from fatty acids or reactive derivatives thereof.

62. The mix of claim 61, wherein the weight of fatty acid residues is 5 to 50% based on the weight of the derivatized highly branched polysaccharide.

63. The mix of claim 62, wherein the weight of fatty acid residues is 15 to 40% based on the weight of the derivatized highly branched polysaccharide.

64. The mix of claim 51, wherein said polyether polyol with which the underivatized polysaccharide is incompatible comprises at least 50% polypropylene oxide.

65. The mix of claim 51, wherein said polyether polyol with which the underivatized polysaccharide is incompatible has a molecular weight in the range of from 200 to 12,000.

66. The mix of claim 65, wherein said polyether polyol with which the underivatized polysaccharide is incompatible has a molecular weight in the range of from 2,000 to 7,000.

67. The mix of claim 51, wherein said polyether polyol with which the underivatized polysaccharide is incompatible has a hydroxyl value of at most 60 mg KOH/g.

68. The mix of claim 51, wherein said polyether polyol with which the underivatized polysaccharide is incompatible has a hydroxyl value of 15 to 55 mg KOH/g.

69. The mix of claim 51, wherein the active hydrogen-containing compound is selected from the group consisting of polyols, polyamines, polyamides, polyimines and polyolamines.

70. The mix of claim 69, wherein the active hydrogen-containing compound comprises a polyol.

71. The mix of claim 70, wherein the polyol is a polyether polyol.

72. The mix of claim 71, wherein said polyol comprising polyether polyol contains polypropylene oxide.

73. The mix of claim 71, wherein said polyol comprising polyether polyol has a functionality of at least 2.

74. The mix of claim 71, wherein said polyol comprising polyether polyol has a molecular weight in the range of from about 200 to about 12,000.

75. The mix of claim 74, wherein said polyol comprising polyether polyol has a molecular weight in the range of from about 2,000 to about 7,000.

76. The mix of claim 71, wherein the polyether polyol of said reaction mixture is the same as the polyether polyol of the compability indicating mixture.

77. The mix of claim 71, wherein the polyether polyol of said reaction mixture is different from the polyether polyol of the compatibility indicating mixture.

78. The mix of claim 51, wherein said mix further comprises at least one blowing agent selected from the group consisting of water, non-water blowing agents, liquid carbon dioxide and combinations thereof.

79. The mix of claim 78, wherein said non-water blowing agents are low-boiling organic liquids.

80. The mix of claim 78, wherein said blowing agent is water.

81. The mix of claim 51, wherein said mix further comprises at least one catalyst and at least one surfactant.

82. The mix of claim 81, wherein said catalyst is selected from the group consisting of tertiary amines and metallic salts or mixtures thereof.

83. The mix of claim 81, wherein said surfactant is selected from the group consisting of silicone surfactants.

84. The mix of claim 51 wherein said reaction mixture further comprises crosslinking agents and additives.

85. The mix of claim 51 comprising said mixture of the active hydrogen-containing compound and the highly branched polysaccharide, wherein said polysaccharide which is derivatized is added in an amount sufficient to confer load building to a flexible isocyanate-based polymer.

86. The mix of claim 51, wherein said foamed isocyanate-based polymer has an Indentation Force Deflection loss when measured pursuant to ASTM D3574 which is less than that of a reference foam produced by substituting a copolymer polyol for the derivatized highly branched polysaccharide in the reaction mixture, the foamed isocyanate-based polymer and the reference foam having substantially the same density and Indentation Force Deflection when measured pursuant to ASTM D3574.

87. The mix of claim 51, wherein said foamed isocyanate-based polymer has thickness loss when measured pursuant to ASTM D3574 which is less than that of a reference foam produced by substituting a copolymer polyol for the derivatized highly branched polysaccharide in the reaction mixture, the foamed isocyanate-based polymer and the reference foam having substantially the same density and Indentation Force Deflection when measured pursuant to ASTM D3574.

88. The mix of claim 51, wherein said active hydrogen containing compound is a polypropylene oxide containing polyether polyol and said derivatized polysaccharide is a polydextrose having an active hydrogen functionality of at least 15, derivatized with a $C_{8-12}$-fatty acid to provide a hydrophobicity which renders it compatible with a polyether polyol with which the underivatized polysaccharide is incompatible.

89. A process for producing a foamed isocyanate-based polymer comprising the steps of: contacting an isocyanate, an active hydrogen-containing compound, a blowing agent and a highly branched polysaccharide of randomly bonded glucopyranose units, having an average number of 10-100 glucose residues and an active hydrogen functionality of at least 15 to form a reaction mixture; and expanding the reaction mixture to produce the foamed isocyanate-based polymer; wherein said polysaccharide is derivatized to provide a hydrophobicity which renders it compatible with a polyether polyol with which the underivatized polysaccharide is incompatible.

90. The process of claim 89, wherein said derivatized highly branched polysaccharide has an active hydrogen functionality of 15 to 70.

91. The process of claim 89, wherein said derivatized highly branched polysaccharide has a solubility parameter below 14.

92. The process of claim 89, wherein said hydrophobicity of said derivatized polysaccharide is sufficient to cause a compatibility indicating mixture of said polysaccharide and said polyether polyol with which the underivatized polysaccharide is incompatible, said compatibility indicating mixture comprising at least 5% (w/w) of said derivatized polysaccharide to form a uniform liquid at 23° C.

93. The process of claim 92, wherein said compatibility indicating mixture comprising 5 to 50% of the derivatized polysaccharide forms a uniform liquid at 23° C.

94. The process of claim 89, wherein said polysaccharide is derivatized by a chemical reaction with an organic compound comprising 6-20 carbon atoms selected from aliphatic and aromatic carbon atoms and combinations thereof.

95. The process of claim 94, wherein said organic compound is selected from $C_6$-$C_{12}$ carboxylic acids and $C_6$-$C_{12}$ organic alcohols.

96. The process of claim 95, wherein said carboxylic acid is selected from fatty acids or reactive derivatives thereof.

97. The process of claim 96, wherein the weight of fatty acid residues is 5 to 50% based on the weight of the derivatized highly branched polysaccharide.

98. The process of claim 97, wherein the weight of fatty acid residues is 15 to 40% based on the weight of the derivatized highly branched polysaccharide.

99. The process of claim 89, wherein said polyether polyol with which the underivatized polysaccharide is incompatible comprises at least 50% polypropylene oxide.

100. The process of claim 89, wherein said polyether polyol with which the underivatized polysaccharide is incompatible has a molecular weight in the range of from 200 to 12,000.

101. The process of claim 100, wherein said polyether polyol with which the underivatized polysaccharide is incompatible has a molecular weight in the range of from 2,000 to 7,000.

102. The process of claim 89, wherein said polyether polyol with which the underivatized polysaccharide is incompatible has a hydroxyl value of at most 60 mg KOH/g.

103. The process of claim 102, wherein said polyether polyol with which the underivatized polysaccharide is incompatible has a hydroxyl value of 15 to 55 mg KOH/g.

104. The process of claim 89, wherein the active hydrogen-containing compound is selected from the group comprising polyols, polyamines, polyamides, polyimines and polyolamines.

105. The process of claim 104, wherein the active hydrogen-containing compound comprises a polyol.

106. The process of claim 105, wherein the polyol is a polyether polyol.

107. The process of claim 106, wherein said polyol comprising polyether polyol contains polypropylene oxide.

108. The process of claim 106, wherein said polyol comprising polyether polyol has a functionality of at least 2.

109. The process of claim 106, wherein said polyol comprising polyether polyol has a molecular weight in the range of from about 200 to about 12,000.

110. The process of claim 109, wherein said polyol comprising polyether polyol has a molecular weight in the range of from about 2,000 to about 7,000.

111. The process of claim 106, wherein said polyether polyol of said reaction mixture is the same as the polyether polyol of the compatibility indicating mixture.

112. The process of claim 106, wherein said polyether polyol of said reaction mixture is different from the polyether polyol of the compatibility indicating mixture.

113. The process of claim 89, wherein said isocyanate-based polymer is expanded to form flexible polyurethane foam.

114. The process of claim 89, wherein the ratio of isocyanate groups of said isocyanate and hydroxyl groups of said polyol is from about 1.2:1 to 1:1.2.

115. The process of claim 114, wherein the ratio of isocyanate groups of said isocyanate and hydroxyl groups of said polyol is from about 1.1:1 to 1:1.1.

116. The process of claim 89, wherein the isocyanate is represented by the general formula: $Q(NCO)_i$ wherein i is an integer of two or more and Q is an organic radical having the valence of i.

117. The process of claim 116, wherein the isocyanate is selected from the group consisting of hexamethylene diisocyanate, 1,8-diisocyanato-p-methane, xylyl diisocyanate, $(OCNCH_2CH_2CH_2CH_2O)_2$, 1-methyl-2,4-diisocyanatocyclohexane, phenylene diisocyanates, tolylene diisocyanates, chlorophenylene diisocyanates, 4,4'-methylene-diphenyldiisocyanate, naphthalene-1,5-diisocyanate, triphenylmethane-4,4',4"-triisocyanate, isopropylbenzene-alpha-4-diisocyanate and mixtures thereof.

118. The process of claim 89, wherein the isocyanate comprises a prepolymer.

119. The process of claim 89, wherein isocyanate is selected from the group consisting of 1,6-hexamethylene diisocyanate, 1,4-butylene diisocyanate, furfurylidene diisocyanate, 2,4-toluene diisocyanate, 2,6-toluene diisocyanate, 2,4'-methylene diphenyldiisocyanate, 4,4'-methylene diphenyldiisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl -4-isocyanatophenyl) methane-, polymethylene polyphenyl polyisocyanates and mixtures thereof.

120. The process of claim 89, wherein the isocyanate is selected from the group consisting of (i) 2,4'-methylene diphenyldiisocyanate, 4,4'-methylene diphenyldiisocyanate and mixtures thereof; and (ii) mixtures of (i) with an isocyanate selected from the group consisting of 2,4-toluene diisocyanate, 2,6-toluene diisocyanate and mixtures thereof.

121. The process of claim 89, wherein the isocyanate is polymeric methylene diphenyldiisocyanate.

122. The process of claim 89, wherein said reaction mixture said blowing agent is selected from the group consisting of water, non-water blowing agents, liquid carbon dioxide and combinations thereof.

123. The process of claim 122, wherein said non-water blowing agents are low-boiling organic liquids.

124. The process of claim 122, wherein said blowing agent is water.

125. The process of claim 124, wherein the water is used in an amount of from about 0.5 to about 40 parts by weight per 100 parts by weight of active hydrogen-containing compound used in the reaction mixture.

126. The process of claim 125, wherein the water is used in an amount of from about 1.0 to about 10 parts by weight per 100 parts by weight of active hydrogen-containing compound used in the reaction mixture.

127. The process of claim 89, wherein said reaction mixture further comprises at least one catalyst and at least one surfactant.

128. The process of claim 127, wherein said catalyst is selected from the group consisting of tertiary amines and metallic salts or mixtures thereof.

129. The process of claim 127, wherein said surfactant is selected from the group consisting of silicone surfactants.

130. The process of claim 89 comprising the steps of: contacting an isocyanate, an active hydrogen-containing compound, a blowing agent and a highly branched polysaccharide of randomly bonded glucopyranose units, having an average number of 10-100 glucose residues and an active hydrogen functionality of at least 15 to form a reaction mixture, wherein said highly branched polysaccharide which is derivatized is added in an amount sufficient to confer load building to said flexible isocyanate-based polymer.

131. The process of claim 89, wherein said isocyanate-based polymer has an Indentation Force Deflection loss when measured pursuant to ASTM D3574 which is less than that of a reference foam produced by substituting a copolymer polyol for the derivatized highly branched polysaccharide in the reaction mixture, the foamed isocyanate-based polymer and the reference foam having substantially the same density and Indentation Force Deflection when measured pursuant to ASTM D3574.

132. The process of claim 89, wherein said foamed isocyanate-based polymer has thickness loss when measured pursuant to ASTM D3574 which is less than that of a reference foam produced by substituting a copolymer polyol for the derivatized highly branched polysaccharide in the reaction mixture, the foamed isocyanate-based polymer and the reference foam having substantially the same density and Indentation Force Deflection when measured pursuant to ASTM D3574.

133. The process of claim 89 comprising the steps of: contacting an isocyanate selected from 2,4-toluene diisocyanate, 2,6-toluene diisocyanate and methylene diphenyldiisocyanate and combinations thereof, a polypropylene oxide containing polyether polyol, water as blowing agent and a polydextrose to form a reaction mixture; and expanding the reaction mixture to produce the foamed isocyanate-based polymer; wherein said polydextrose is derivatized to provide a hydrophobicity which renders it compatible with a polyether polyol with which the underivatized polydextrose is incompatible.

134. A cushion material for household furnishings and automobiles comprising a foamed isocyanate-based polymer of claim 1.

135. A structural element for household furnishings and automobiles comprising a foamed isocyanate-based polymer of claim 1.

136. A carpet underlay comprising a foamed isocyanate-based polymer of claim 1.

137. A packaging application comprising a foamed isocyanate-based polymer of claim 1.

138. A method for molding a foamed isocyanate-based polymer which utilizes the foamed isocyanate-based polymer of claim 1.

139. A method for making alternatively crushed or cut slabs of a foamed isocyanate-based polymer which comprises utilizing the foamed isocyanate-based polymer of claim 1.

* * * * *